May 16, 1967  O. LUTHI  3,320,399
METHOD AND APPARATUS FOR MAKING A HONEYCOMB FILTER
Filed Sept. 13, 1963  12 Sheets-Sheet 2

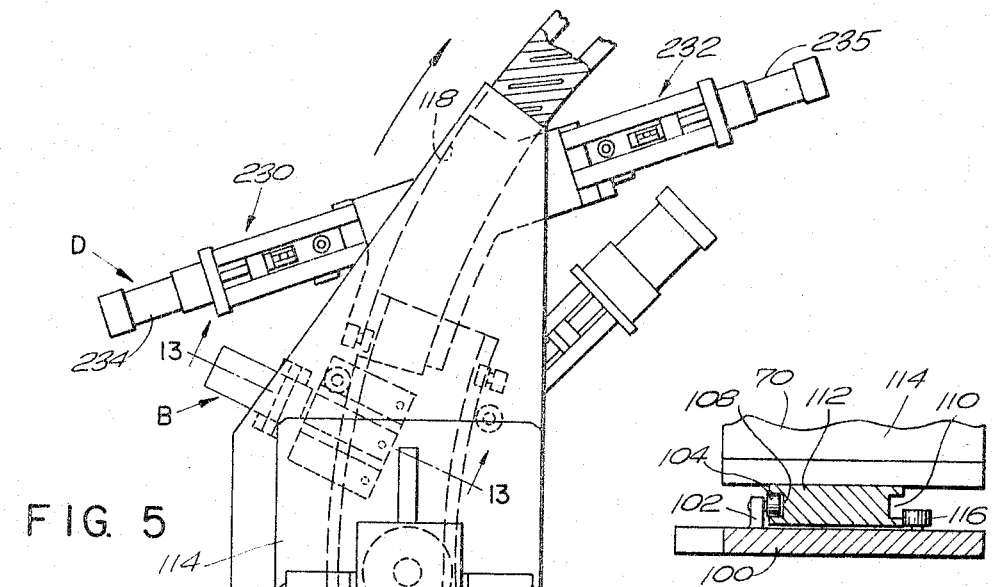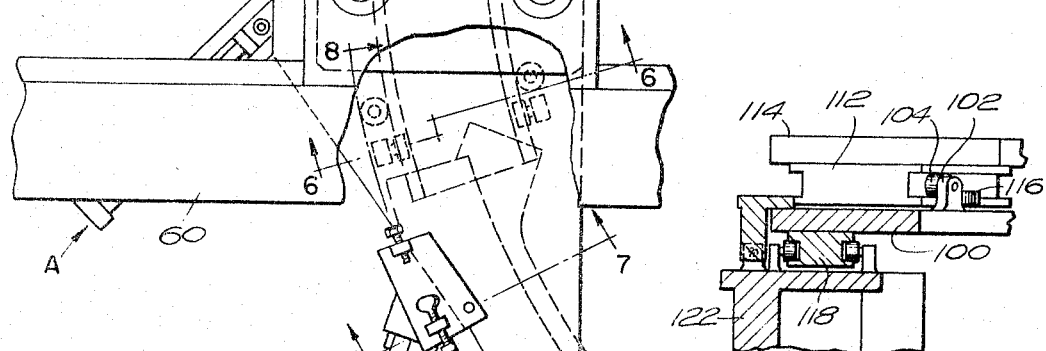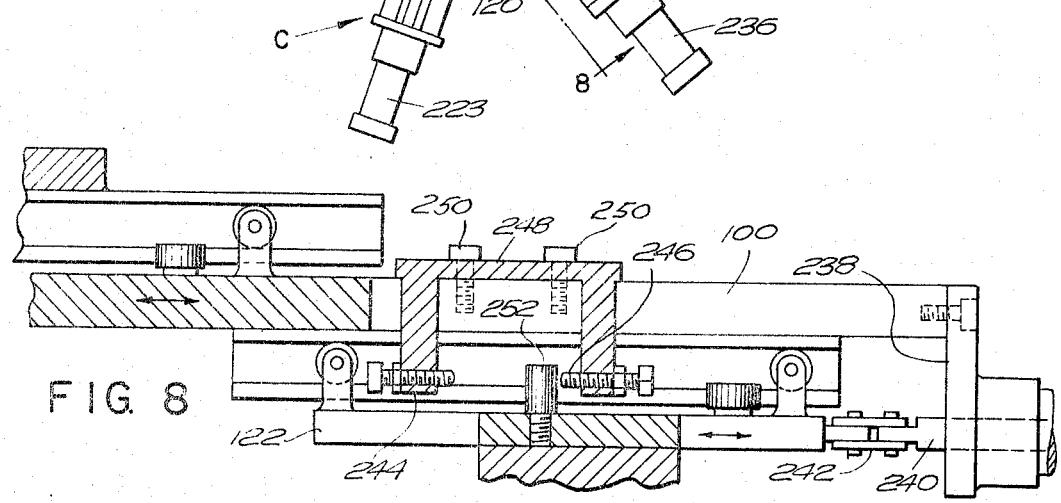

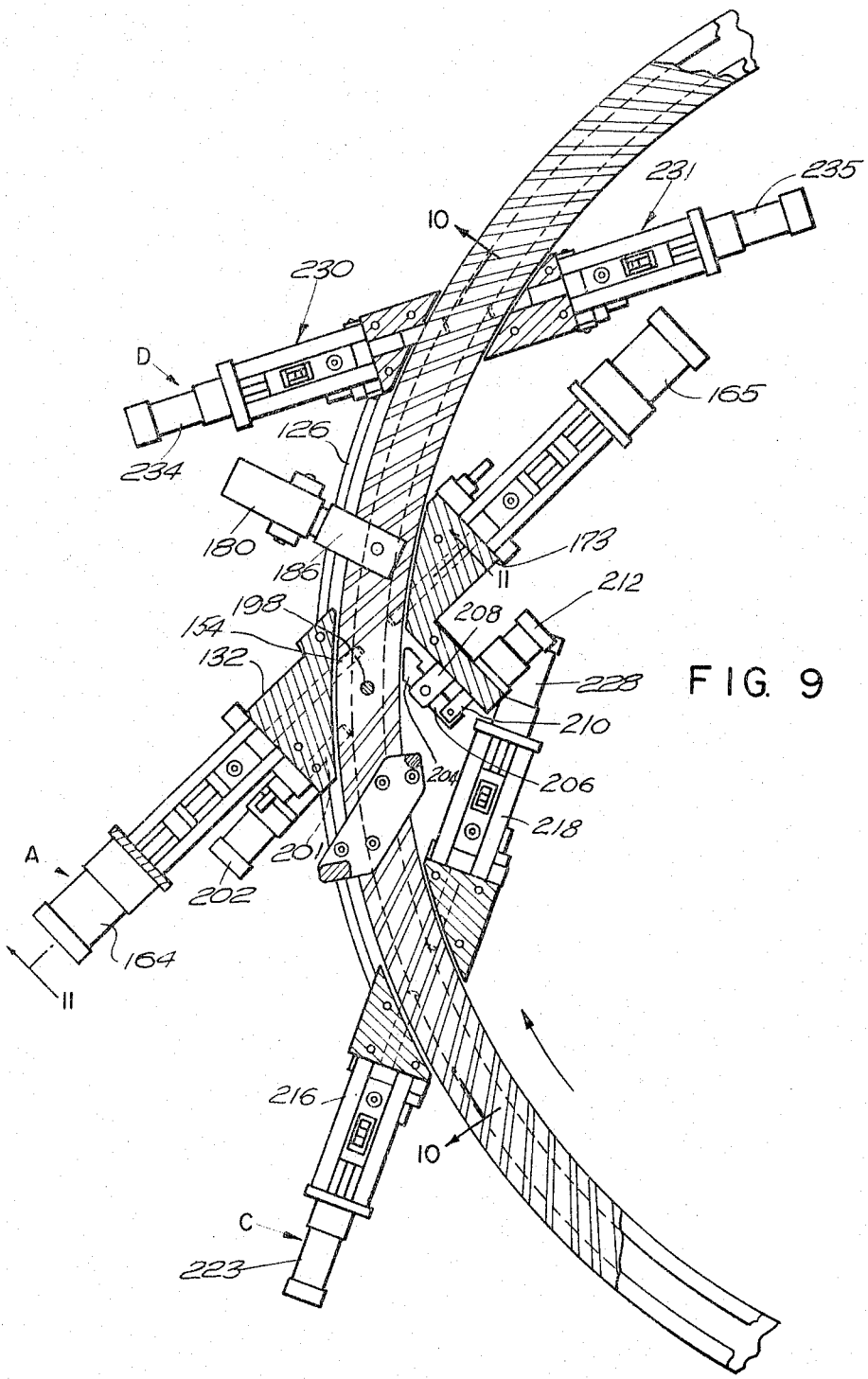

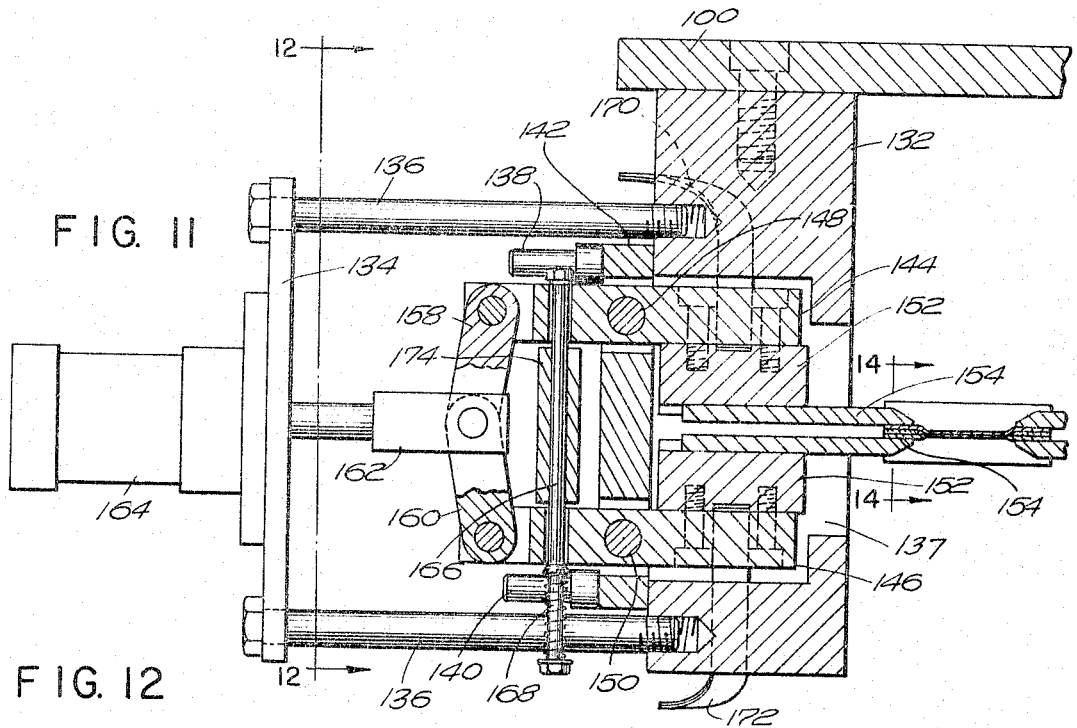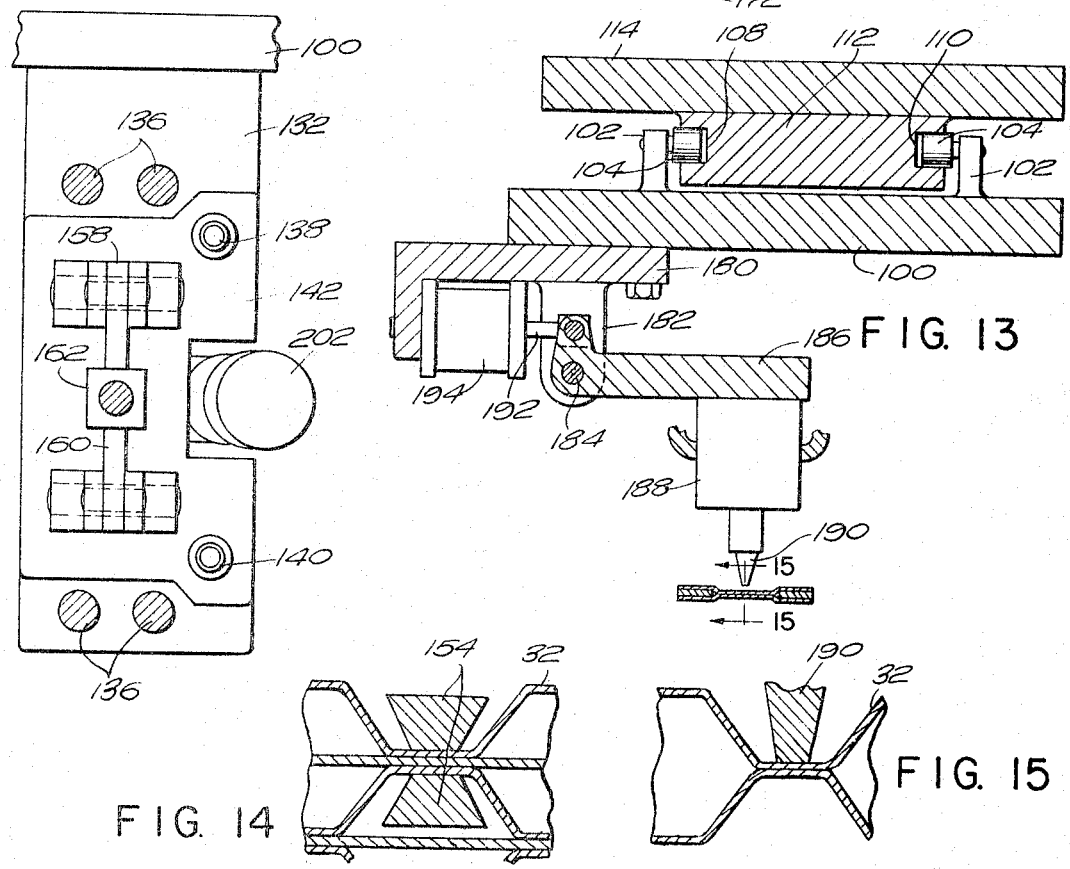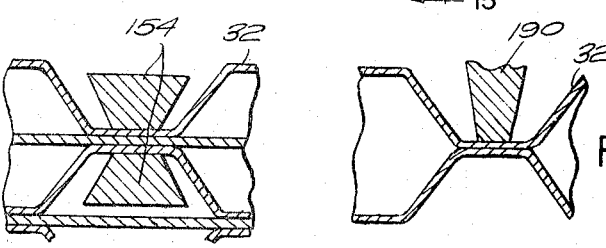

May 16, 1967 O. LUTHI 3,320,399
METHOD AND APPARATUS FOR MAKING A HONEYCOMB FILTER
Filed Sept. 13, 1963 12 Sheets-Sheet 7
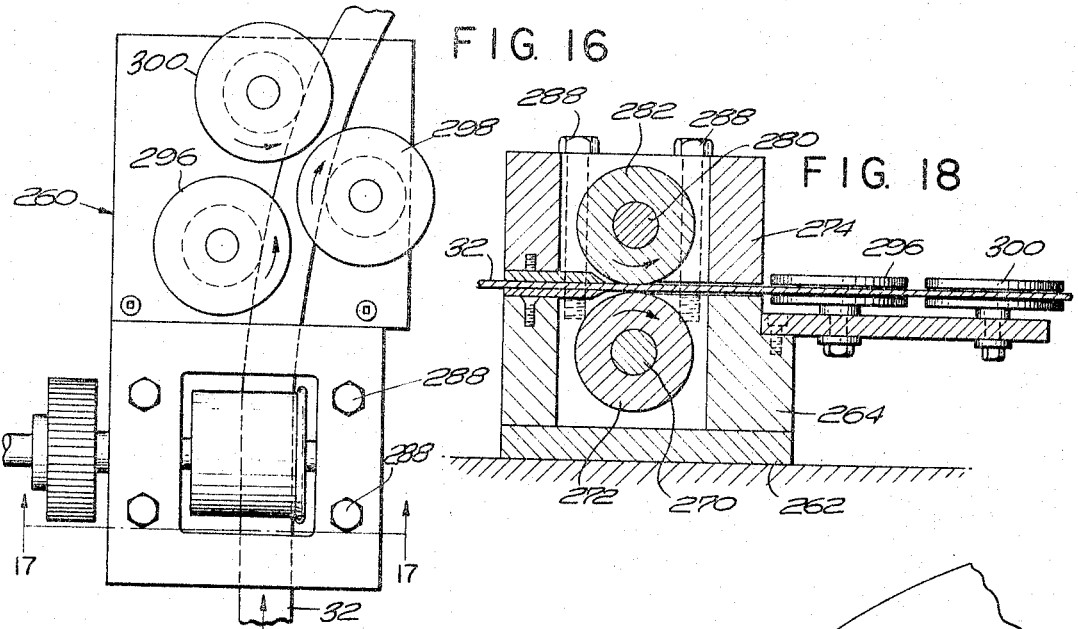
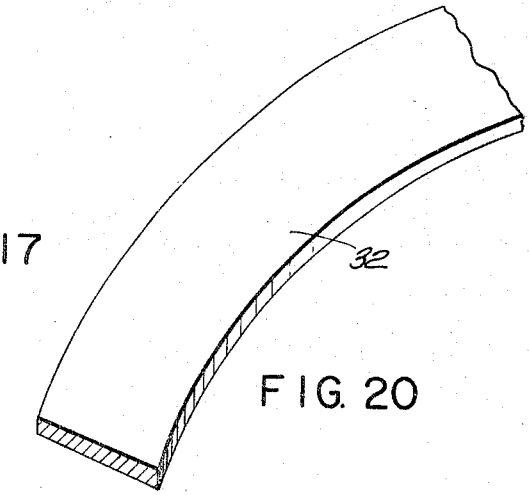
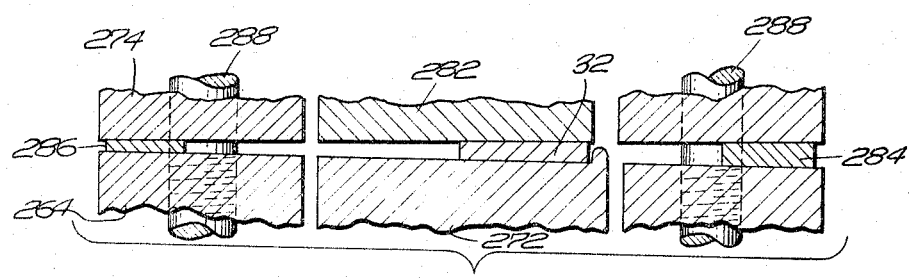

May 16, 1967 O. LUTHI 3,320,399
METHOD AND APPARATUS FOR MAKING A HONEYCOMB FILTER
Filed Sept. 13, 1963 12 Sheets-Sheet 10

United States Patent Office 3,320,399
Patented May 16, 1967

3,320,399
METHOD AND APPARATUS FOR MAKING A HONEYCOMB FILTER
Oscar Luthi, Nashua, N.H., assignor, by mesne assignments, to Improved Machinery, Inc., Nashua, N.H., a corporation of Delaware
Filed Sept. 13, 1963, Ser. No. 308,874
16 Claims. (Cl. 219—78)

The present invention relates to the manufacture of honeycomb-type filters and is more particularly concerned with the manufacture of such filters which are built up of preformed metal strips which are brought together into an open-mesh filter strip assembly of substantial width which is then applied helically to produce a helically built-up filter body.

It is a principal object of the invention to provide a novel apparatus and method of manufacture of honeycomb filters which is well adapted for the rapid and efficient preforming, assembly and fastening together of the strip material of which the filter is composed into the finished product.

Other objects of the invention relate more specifically to the provision of novel constructions and arrangements of parts which are well adapted for carrying out in the most efficient manner the several operations herein set forth in the manufacture of a honeycomb filter in accordance with the invention.

In the preferred embodiment of the invention shown, the honeycob filter is built up of flat strip stock comprising a strip which is of a width corresponding with the thickness of the wall of the finished filter, is waved or corrugated to provide a large number of interstices through the wall, and has imparted thereto a longitudinal transverse curvature corresponding with the peripheral curvature of the drum. In the illustrated construction the waved strip is assembled with two narrow tie strips which are preferably also preformed so that they have a longitudinal transverse curvature corresponding with the peripheral curvature of the drum. The strip material thus provided is combined into a filter strip assembly which is laid along and attached at intervals to the next preceding helical coil, this operation being carrier on as a continuous process until a drum of the desired length is produced.

Other features of the invention relate to the provision of a honeycomb filter drum building mechanism which in the preferred embodiment of the invention shown consists in a support on which the filter coil is built up, a strip material guiding and fastening mechanism supported adjacent thereto, means for imparting relative positional movements to said elements to transfer the strip guiding and fastening mechanism continuously around the peripheral edge of the drum while at the same time assembling said strip material into an assembled filter strip, and for continuously fastening the filter strip assembly to the next preceding coil until a drum of the desired length is produced.

A further feature of the invention consists in the construction and arrangement of the apparatus herein described whereby the several operations of preforming the strip material, of assembling said material into a filter strip assembly, and of fastening the filter strip assembly into the helically built-up filter body is a continuous operation.

With these and other objects in view as may hereinafter appear, the several features of the invention consist in the devices, combinations and arrangement of parts hereinafter described and claimed which together with the advantages to be obtained thereby will be readily understood by one skilled in the art from the following description taken in connection with the accompanying drawings, in which:

FIG. 5 is a large scale plan view of the filter strip positioning and attaching mechanism shown in FIG. 4;

FIG. 6 is a sectional view taken on a line 6—6 of FIG. 5 illustrating one of the roller bearing supports for the main slide on the fixed arcuate guideway;

FIG. 7 is a sectional view taken on a line 7—7 of FIG. 5 illustrating particularly one of the roller bearing supports for a secondary slide on the main slide;

FIG. 8 is a sectional view taken on a line 8—8 of FIG. 5 illustrating particularly the relationship of the main and secondary slides and the mechanism for effecting movements thereof relative to the advancing filter strip;

FIG. 9 is a plan view of the filter drum building assembly including the feeding filter strip and the several strip gripping and welding assemblies;

FIG. 11 is a sectional view in elevation taken on a line 11—11 of FIG. 9, illustrating the main welding unit of the machine;

FIG. 12 is a sectional view taken on a line 12—12 of FIG. 11;

FIG. 13 is a detailed sectional view in elevation taken on a line 13—13 of FIG. 5, but on an enlarged scale illustrating particularly a secondary spot welding device of the machine;

FIG. 14 is a detailed sectional view in elevation taken on a line 14—14 of FIG. 11, but on an enlarged scale, illustrating the manner in which the filter strip is welded to the built-up portion of the filter drum;

FIG. 15 is a detailed sectional view in elevation taken on a line 15—15 of FIG. 13, but on an enlarged scale illustrating the manner in which the adjoining portions of the corrugated strips are welded together;

FIG. 16 is a plan view of the mechanism for imparting the desired lateral curvature to the feeding strip material;

FIG. 17 is a sectional view taken on a line 17—17 of FIG. 16 illustrating the roller feed for the strip material;

FIG. 18 is a sectional view taken on a line 18—18 of FIG. 17 illustrating the strip curving and feeding mechanism of FIGS. 16 and 17 in side elevation;

FIG. 19 is a large scale fragmentary view in section illustrating the manner in which the strip is engaged and tapered laterally under pressure by the strip feeding mechanism shown in FIG. 17;

FIG. 20 is a view in perspective of a piece of the strip material after the curvature has been imparted thereto;

Figure 1:
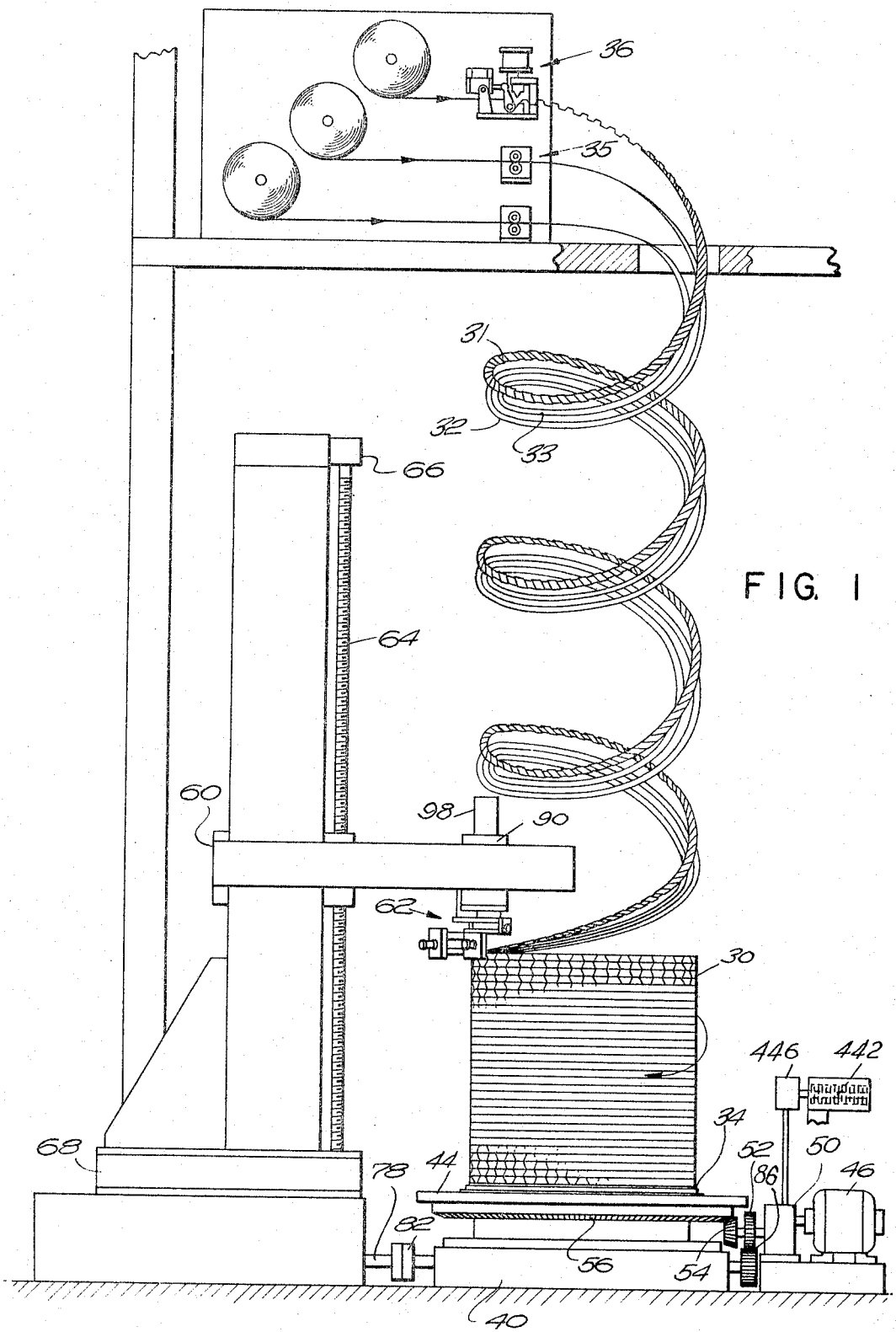
FIG. 1 is a somewhat diagrammatic view of the entire apparatus including the flat strip waving or corrugating machine, a narrow tie strip preforming device by means of which the strip material is preformed including the impressing thereon of a flat transverse curvature corresponding with the peripheral curvature of the drum to be built up, and a honeycomb filter drum building mechanism.
Figure 2:
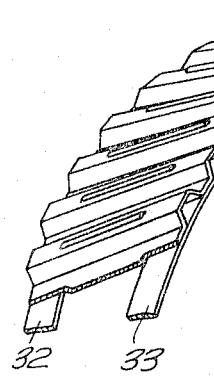
FIG. 2 is a perspective view of the assembled corrugated sheeting and two tapes to which it is secured.

The apparatus shown in the drawings as embodying in a preferred form the several features of the invention is well adapted for building up a filter drum of the general type shown, for example, in the copending U.S. Patent No. 3,105,043, issued Sept. 24, 1963. As more particularly pointed out in said application, a novel filter is provided which is built up of flat strip material into a cylindrical drum structure of great strength, yet wherein the ratio of openings to total area is upwards of 50% and may be upwards of 75%.

Figure 3:
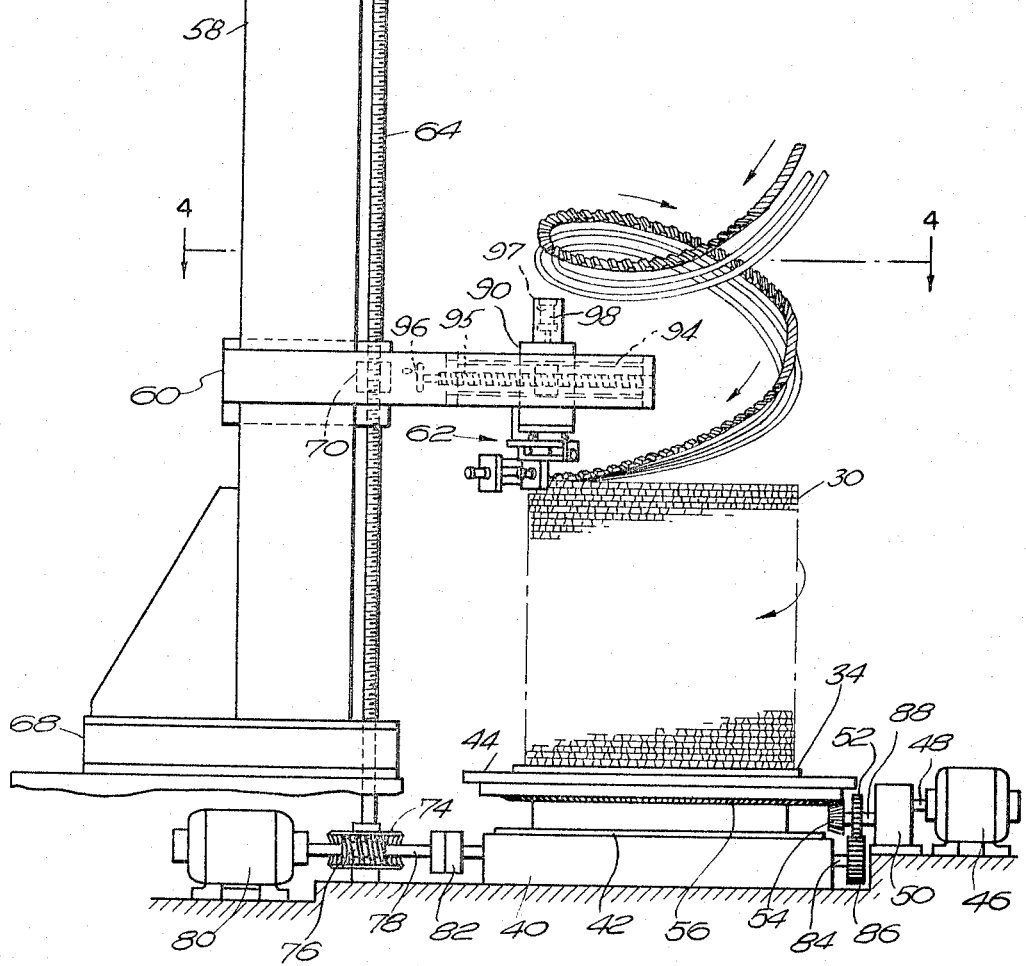
FIG. 3 is a side view of applicant's machine illustrating the rotary base, the column and mechanism for guiding and for fastening the filter strip in place on the filter drum.

The drum structure provided may be made up from flat sheet metal strip or other suitable material such as certain plastics for economy and ease of construction to produce generally radial passageways, either strictly radial or slanted away from the direction of drum travel in the direction of fluid flow into the drum for improved drainage. It is contemplated that the strip formation extends continuously throughout the length of the drum. As best shown in FIGS. 1 and 3, the drum 30 is built up of successive coils of a continuous strip assembly which consists of waved or corrugated flat strip 31 of a width which represents the radial thickness of the drum wall and to which is imparted a longitudinal transverse curvature which is identical with the peripheral curvature of the drum. The waved strip 31 is combined with two narrow flat tie strips 32, 33 which are also preformed so that they have imparted thereto a longitudinal transverse curvature which corresponds also to the peripheral curvature of the drum.

The waved strip 31 and the tie strips 32, 33 are brought together into a helically coiled strip assembly which is welded or otherwise secured at intervals to previously assembled or built-up coils of said filter strip assembly until a drum of the desired length is produced. The filter drum may be provided at each end with a flanged header such as that indicated, for example, at 34 in FIG. 3 to which the first coil of the filter strip assembly comprising said waved strip 31 and tie strips 32, 33 is secured.

While in the preferred form of the invention shown the filter strip assembly is built up of a corrugated or waved strip providing the desired interstices in the drum, in combination with two narrow tie strips added for strength and stability, it is contemplated that a different arrangement of said strips may be employed from that shown including an arrangement in which the tie strips 32, 33 are completely eliminated and in which each successive coil of the waved or corrugated strip is fastened to a preceding coil of said waved strip 31 in the general manner described.

The honeycomb filter manufacturing apparatus herein disclosed as embodying in a preferred form the several features of the invention (see FIG. 1) comprises a strip rolling device generally designated at 35, a strip waving or corrugating device generally designated at 36, and at a lower level the honeycomb filter drum building mechanism generally indicated at 62.

The drum building mechanism, as shown for example in FIG. 3, comprises a base 40 on which is carried a pedestal 42 and a turntable 44. The turntable is driven by means of an electric motor 46 having an armature shaft 48 connected through a reduction gear box 50 with an output shaft 52 having a bevel gear 54 which meshes with a bevel gear 56 formed on the underside of the turntable 44. The base 40 provides support also for a standard 58 on which is mounted a vertically adjustable crosshead 60 which carries a device generally indicated at 62 for assembling the flat tie and waved strip material into an assembled filter strip and for applying said assembly filter strip in successive helical coils to form the built-up honeycomb filter drum. The vertical position of the head 60 and associated device 62 for assembling and attaching said strip material to the drum is controlled by means of a vertical screw shaft 64 rotatably supported at its upper end in a bearing bracket 66 on the standard 58 and at its lower end in a bearing formed in a base support 68 for said standard. The screw shaft 64 is arranged for threaded engagement with a nut 70 fixedly mounted in the head 60 so that rotation of the screw shaft 64 provides a convenient means for raising and lowering the head 60. At its lower end the screw shaft 64 is connected by means of a worm gear 74 with a worm 76 on the armature shaft 78 of a driving motor 80 mounted on the base 40. The screw shaft 64 is connected also with driving motor 46 by means of a mechanical connection between the two motors which includes a coupling 82 connected between an extension of the armature shaft 78 of motor 80 and a connecting drive shaft 84 passing through the pedestal 42 and at its opposite end connected by meshing gears 86, 88 with the output shaft 52 from the reduction gear box 50 through which the turntable 44 is driven from motor 46. The arrangement of the above described gearing is such that the head 60 is driven upwardly by the motor 46 at a rate which is directly related to the rate of rotation of the turntable. During this upward driving movement the motor 80 is electrically disconnected permitting the armature thereof to turn idly. A rapid return downward movement of the head 60 is effected in the following manner. The motor 80 is energized to drive the head 60 downwardly, while at the same time the electromagnetic coupling 82 is de-energized thus disconnecting motor 46, reduction gearing 50 and the mechanism for turning the turntable 44.

Figure 4:
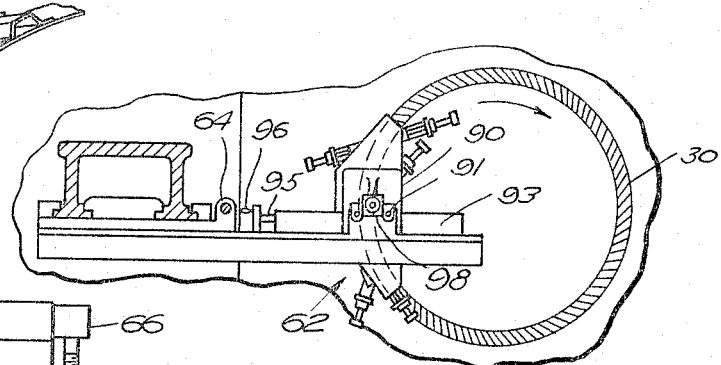
FIG. 4 is a sectional plan view taken on a line 4—4 of FIG. 3 showing the general relation of the filter strip, the attaching mechanism, and supporting column.

The device 62 for assembling and attaching the strip material to the drum is supported in floating relation to the head 60 so that the device 62 rests lightly upon and is guided by the building edge of the honeycomb drum 30. As best shown in FIGS. 3 and 4, the device 62 comprises generally a housing 90 which is formed with guide rods 91 fittted into a tubular guideway carried by a bracket 93 supported for adjustment longitudinally of the cross head 60 on guides 94. An adjusting screw 95 located within a tubular extension of the bracket 93 and secured at one end for movement therewith is threaded through a nut secured to the head 60. A handwheel 96 secured to the free end of the screw provides a convenient means for adjusting the position of the slide 94 transversely in accordance with the diameter of the filter drum 30. The housing 90, together with the mechanism for assembling and attaching the strip material to the filtered drum supported by said housing, is connected to the vertical guideway 92 by means of a vertically disposed air cylinder 97 secured to an upwardly extending bracket 98 on the housing 90 and having the piston element 98 thereof connected to the upper end of the slide 94. Air is supplied to the cylinder 97 tending to lift the housing 90 under a pressure which is sufficient to substantially offset the weight of the housing 90 and associated parts so that the entire device 62 for assembling and attaching the strip material to the drum rests lightly upon and is supported by the building edge of the honeycomb drum 30.

The filter strip positioning and attaching device 62 carried on the crosshead 60 comprises an arcuate main slide 100 (see FIGS. 5, 6, 7, 10, 13) which is supported by means of hangers 102 having support rollers 104 which ride in tracks 108 formed in the sides of an arcuate guideway 112 secured to the underside of a head plate 114 which forms part of the floating housing 90. The arcuate guideway 112 follows the curvature of the filter wall being built up from the turntable 42. In order that the main slide 100 may be positioned accurately in a horizontal plane with relation to the arcuate guideway 112, rollers 116 are provided on the slide 100 for engagement with the sides of the guideway. The main slide 100 provides support for a main gripper and welding unit A and an additional spot welding unit B (see FIG. 5) as hereinafter more fully set forth, and is also equipped with arcuate guideways 118, 120 from which are suspended two secondary feed slides 122, 124, see FIGS. 4-9, inclusive. The slides 122, 124 (see FIG. 10) are rigidly connected together to move as a unit by means of a link 126 connected at one end to a bracket 128 on slide 122 and at its other end to a downwardly extending bracket 130 on slide 124. The secondary feed slides 122, 124 taken together are referred to as a feed slide. The secondary feed slide element 122 carries a combined gripping and preheating unit C, and the secondary feed slide 124 carries a second gripping and preheating unit D (see FIG. 5), these units hereinafter to be described. Current flows from the preheating unit C to the preheating ing unit D through the intervening portion of the filter strip structure for heating same.

The main slide 100 and the secondary feed slides 122, 124 of the filter strip positioning and attaching device are constructed and arranged to be connected with and to be moved in alternation with the filter strip material which is continuously advanced by the power rotation of the turntable 44 and filter drum build-up thereon. Each of these slides in turn at the end of its advancing movement is then moved in the reverse direction while the other slide is advancing. The mechanism for effecting the back feeding movement of each of said slides while the other said slide is being advanced comprises a pneumatically operated power slide resetting device connected between the two slides as hereinafter more fully set forth.

The gripper and welding unit A on the main slide 100 as specifically illustrated in FIGS. 9, 11 and 12 comprises two identical gripper and welding devices which are located in line with one another at opposite sides of the path of movement of the relatively advancing filter strip assembly and on opposite sides of the wall of the filter drum build-up to which the strip assembly is being attached. One of the two gripper and welding devices generally designated in FIG. 9 as unit A is more specifically illustrated in FIGS. 11 and 12. Said gripper and welding device comprises a bracket 132 depending from the slide 100 to which is attached a rearwardly extending frame consisting of a plate 134 spaced from the bracket 132 by means of four bolts 136 screw threaded at their inner ends into sockets formed in the bracket 132. The bracket 132 is formed with a rectangular aperture 137 through which the gripper and welding devices operate. There are also mounted on the bracket 132 two rearwardly extending guide pins 138, 140 which provide a sliding support for a carriage 142 which overlies the rear face of the bracket 132. The carriage 142 provides pivotal support for two gripper arms 144, 146 mounted respectively on transverse pivots 148, 150 supported in transverse plate 142. A forwardly projecting end of each of the gripper arms 144, 146 projects through the aperture 137 in the bracket 132 and has secured thereto a guide block 152 in which is mounted one of two cooperating gripper and welding elements 154. At the rear end the gripper arms 144, 146 are connected by toggle links 158, 160 with the piston rod extension 162 of a fluid pressure actuated cylinder 164 mounted on the rear face of the plate 134. The two gripper arms 144, 146 are normally biased in a direction to open the jaws of the device by means of a tension rod 166 which is loosely fitted through apertures formed in respective two gripper arms 144, 146. A compression spring 168 interposed between a nut threaded to one end of the rod 68 and the adjacent outer face of the lower gripper arm 146 tends normally to maintain the jaws and gripper elements in a relative open position. An electric current is supplied to the two cooperating gripper and welding elements 154 respectively by electrical wire connectors generally designated at 170, 172.

The cooperating gripper and welding device of welding unit A which as indicated operates from within the drum assembly in line with the gripper and welding device above described comprises a downwardly extending bracket 173 which is the counter-part of bracket 132 above described and which provides support for the identically similar inside gripper and welding device of the unit A including an actuating pneumatic cylinder 165.

The operation of the gripper and welding unit A will be briefly described as follows with reference to the outside gripper and welding device illustrated in FIG. 11, it being understood that the inside gripper and welding device operates simultaneously and in an identical manner.

Referring specifically to FIG. 11, the plunger or piston 162 of the pressure cylinder 164 is shown as fully advanced causing the toggles 158, 160 to be straightened so that the grippers 154 are moved toward one another to engage and firmly grip the work in the manner shown in FIG. 14. An electric current is now supplied through the wires 170, 172 to effect the welding of the clamped work. The piston 162 is then moved to its retracted position to the left from the advanced position shown in FIG. 11. The toggle connection 158, 160 is broken thus releasing the grippers 154 which together with the gripper arms 144, 146 are permitted to open until the rear ends of the arms 144, 146 engage with a sleeve member 174 on the tension pin 166. The continued rearward movement of the piston 162 to the left causes the slide 142 carrying the gripper assembly to be moved bodily to the left removing the grippers 154 from engagement with the advancing filter strip assembly. The gripper and welding unit A has as its principal functions to firmly engage the newly added tie strip 32 and a recessed portion of the corrugated or waved strip 31 to a rise portion of the previously secured coil of the corrugated strip 31, to effect the welding of these parts together, and to attach the main slide 100 to the previously formed portion of the drum build-up so that the slide 100 is advanced with the drum during this welding operation.

The main slide 100 also provides support for the spot welding device generally indicated at B in FIG. 5 and as shown in detail in the sectional views 13 and 15. The spot welding unit B comprises a bracket 180 secured to the underside of main slide 100, having formed thereon a downwardly extending lug 182 providing a pivotal support at 184 for a bell crank lever 186. A spot welding head 188 depending from a horizontally positioned arm of the bell crank lever 186 is provided with a welding tip 190 adapted for engagement with a central valley portion of the waved filter strip 32. An upwardly extending arm of the bell crank lever 186 is connected with a piston 192 of a fluid pressure actuated cylinder 194 secured to the bracket 180. During that portion of the cycle when the main slide 100 is feeding with the drum, the welding unit 188 is moved downwardly from the position shown in FIG. 13 so that the tip 190 is engaged with the filter strip as shown in FIG. 15 and current is applied to effect the welding operation. Thereafter the flow of air to the cylinder 194 is reversed and the welding tip 190 is raised to its initial inoperative position.

Figure 10:
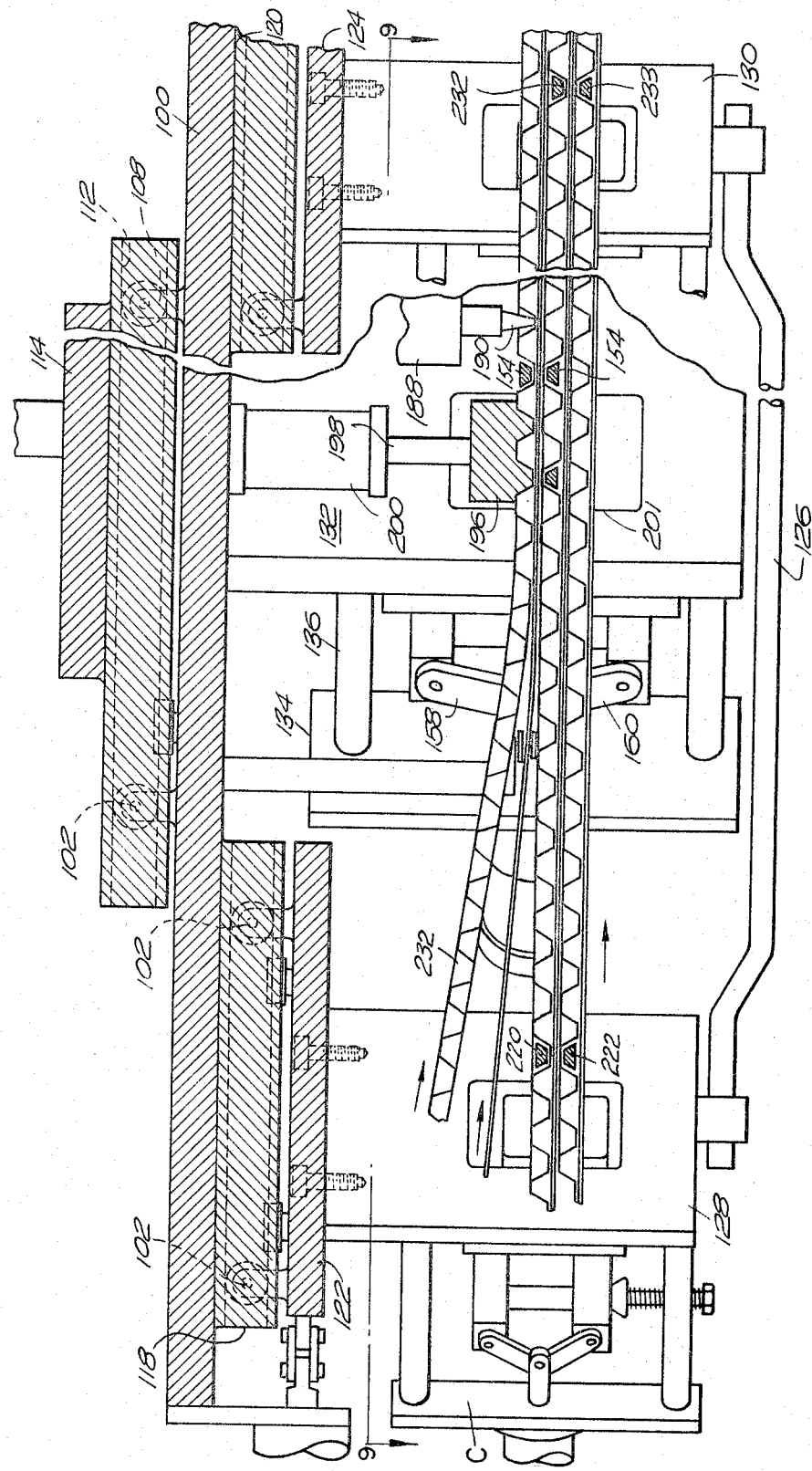
FIG. 10 is an enlarged sectional view in side elevation taken on a line 10—10 of FIG. 9 illustrating particularly the units for gripping and for welding the filter strip to the built-up portion of the filter drum.

As best shown in FIG. 10 the slide 100 provides support also for a filter strip locating device by means of which the corrugated or waved filter strip 32 is accurately positioned with relation to the previously attached coil of the filter strip 32 in advance of the welding operation by gripper and welding unit A and spot welding unit B, so that each valley portion of the feeding portion of the filter strip 32 is in exact alignment with a high portion of the previously secured coil of said filter strip. This mechanism, as best shown in FIG. 10, comprises a press member 196 which is mounted on the bottom end of a vertically arranged piston 198 of a pressure cylinder unit 200 secured to the underside of the slide 100. The underside of the press member 196 is grooved to engage accurately with the corrugations of the filter strip 32. Slightly in advance of the moment at which the press member 196 is moved to press position, a locating finger 201 (see FIGS. 9 and 10) is moved longitudinally into a valley in the underside of the preceding attached layer of filter strip by the operation of an air cylinder 202, the piston of which is directly attached to said finger 201. The air cylinder unit 202 is secured to the supporting bracket 132 for the gripper and welding unit A. At the same time also a cooperating laterally acting press member 204 (see FIG. 9) is rendered operative to push the filter strip 32 sideways thus compensating for any tendency of the diagonally positioned corrugations to force the filter strip 32 laterally. The press member comprises a shoe formed on one end of a short lever 206 pivoted on a lug 208 on an extension of the bracket 173. The other end of the lever 206 is connected with the piston 210 of a pressure cylinder 212.

The left hand slide 122 of the interconnected secondary feed slides 122, 124 has supported thereon a feed gripper unit C which grips successive previously attached portions of the filter strip 32, and also acts as a heating unit to preheat portions of the already secured together filter drum assembly preparatory for the welding of the next succeeding layer of filter strip 32 thereto. Inasmuch as the feed gripper unit C is substantially identical with the gripper and welding unit A this unit is shown in outline form only in FIGS. 9 and 10, comprising an outside gripper device 216 and an opposed inside gripper device 218. The outside gripper members 220, 222 controlled by an air operated cylinder 223 are specifically illustrated in FIG. 10 in gripping position between adjacent corrugations of the last completed layer of the filter drum assembly. For applying the desired heat to the gripped portions of the last secured layers of filter strip 32, electricity is supplied from a suitable source to the two gripping members 220 and 222, and to the co-operating inner unit gripping members similarly not shown which are operated by an air cylinder 228.

The secondary feed slide 124 connected as above set forth to move with the slide 122 provides support for a feed gripper unit D shown generally in views 5, 9 and 10.

Inasmuch as the gripper unit D is identical in all material respects with the gripper unit A above described and fully illustrated in FIGS. 9-12, inclusive, this unit is shown in outline only in FIGS. 5, 9 and 10. As shown, there are provided an outer gripping device 230, and an inner gripping device 231, the gripping arms associated with the outer gripping device 230 being indicated at 232 and 233 respectively in FIG. 10 operated by an air cylinder 234. The grippers of the inner unit, not shown, are operated by an air cylinder 235.

The main slide 100 and the interconnected auxiliary slides 122, 124 and the several gripper and fastening units mounted thereon are constructed and arranged to be moved in alternation with the continuously rotating filter strip drum assembly each slide being returned in a reverse direction to take up a new position with relation to the advancing filter strip 32 while the other said slide is operatively connected with the filter strip by the continued operation of the filter strip gripping and fastening devices on said latter slide. The mechanism for back feeding each slide with relation to the other in alternation comprises an air operated cylinder 236, see FIGS. 5, 8 and 11, which is attached to an end plate 238, on the slide 100, and which is provided with a piston 240 connected by a link 242 with the adjacent auxiliary slide 122. When air is admitted to the inner or upper end of the cylinder 236 as shown in FIG. 5 the outward movement of the piston 240 will cause the interconnected secondary feed slides 122, 124 to be back fed with relation to the main slide 100. Conversely when air is admitted to the outer end of the air cylinder 236 the main slide 100 is back fed with relation to the secondary feed slides 122, 124. The extent of the relative movement is determined by two adjustable stop screws 244, 246 mounted in two separated ears of a bracket 248 secured by bolts 250 to the main slide 100, and an abutment 252 screw threaded into the secondary feed slide 122 for relative movement between stop engaging limit positions. The relative back feeding movement permitted by the stop screws 244, 246 is exactly adjusted to bring the operating elements on the back fed slide exactly into position for engagement with the next intended welding and gripping contact point on the advancing filter strip 32.

The illustrated apparatus for the manufacture of honeycomb filters includes a pair of spiraling machines for imparting a helical bias to the strip metal stock of which the tie members are made, and a filter strip corrugating machine for waving and for imparting a helical bias to the wider strip metal stock of which the corrugated filter strip is made. These machines are preferably mounted at a substantially higher level than the filter assembling machine above described so that the helically biased strip material will move downwardly in spirals as it is produced into assembly position as shown in FIG. 3.

The spiraling machines of which only one is shown in FIGS. 16-20 generally indicated at 260 each comprise a stand having a bottom plate 262 and a square frame 264 providing bearing support for two ball bearings 266, 268, a shaft 270 and a bottom press roller 272 mounted on said shaft. A second square frame 274 supported on top of the bottom frame 264 provides support for two ball bearings 276, 278, a shaft 280 and an upper press roll 282. The two frames 264, 274 are separated by shims 284, 286 and the assembly including the two frames and interposed shims is held firmly together by four bolts 288. The two shafts are geared together by means of gears 290, 292 and are continuously driven from power input shaft 294 which is shown as an extension of the upper shaft 280.

The shims 284, 286 are chosen so that the outer portion of the strip stock passing through the press is pressed slightly more, thus thinning the strip slightly more than the corner portion of the strip and so imparting a slight lateral curvature to the strip. The strip is further guided as it leaves the press by narrow rollers 296, 298, 300 which engage the edges of the strip, each said roller having an overlying and an underlying disk of larger diameter secured thereto to be projected respectively over and under the adjacent face portions of the feeding strip.

The filter strip corrugating machine illustrated in FIGS. 21-27, inclusive, comprises a base plate 302 and a top plate 304 which are rigidly secured together by three vertically extending posts 306, 308, 310. The bending of the strip material to form each successive pair of bottom and top folds or waves in the material including the small ridges required in both the bottom and top folds for use in the secondary spot welding operation is effected in three successive steps by the use of three separate press components which operate successively first to place the spot weld elongated indent or dimple in the last previously formed bottom and top folds, and then to form the down bend and bottom flat of the corrugation, and finally to form the return upward bend and top flat of the next succeeding corrugation. These operations are shown in the successive diagrammatic views of FIGS. 25, 26 and 27.

The press elements acting against the under face of the filter strip stock include a die 312 secured to the bottom plate of the press shaped to provide from right to left a top flat 314, a downward slope 316, a bottom flat 318 with a spot welding dimple recessed therein, an upward slope 320, a second top flat 322 having a dimple formed thereon, another down slope 324 and finally a second bottom flat 326 not having a dimple. There is also mounted on the bottom plate 302 of the press a rotatable press member 328 which acts when rotated clockwise to form an upward bend 330 and top flat 332 in the filter strip stock.

The press elements acting against the upper face of the filter strip stock include a press block 334 secured to the underside of a horizontally disposed vertically movable press plate 336. The press block 334 has formed thereon a generally V-shaped press surface which parallels the sloping press surfaces 316, 320 of the die block 312 and cooperating dimple forming die surfaces corresponding with those formed on each of the two high flats 314 and 322 and the low flat 318. Downward movement of the press plate 336 and press block 334 from the position shown in FIG. 25 to the press position shown in FIG. 27 causes the sloping sides thereof to engage the previously formed corrugation against the sloping walls 316, 320 and the cooperating dimple forming surfaces 322, 318 to form dimples in the respective high and low flats. This is the position shown in FIG. 26.

Adjacent the movable press block 334 and similarly supported from the vertically movable press plate 336 is a rotatable press element 338 having two downwardly sloping surfaces 340, 342, a low flat 344 and a high flat 346. During the downward movement of the press plate 336 and press block 334 above described the rotatable press element 338 occupies the dot-and-dash position of FIG. 26, so that the filter strip occupies the corresponding dot-and-dash position of FIG. 26. The press element 338 is now rotated counterclockwise to the solid line position of FIG. 26 causing surfaces 340 and 344 to mate with surfaces 324 and 326 of the fixed die 312 to form one-half of a new wave or corrugation in the filter strip. Finally, the rotatable press element 328 is rotated clockwise from the retracted position of FIG. 26 to the position of FIG. 27 in which surfaces 350 and 352 thereof are pressed against surfaces 342 and 346 of press element 338 in the advanced position shown in FIG. 27 to form the second half of a new wave in the filter strip.

Figure 25:
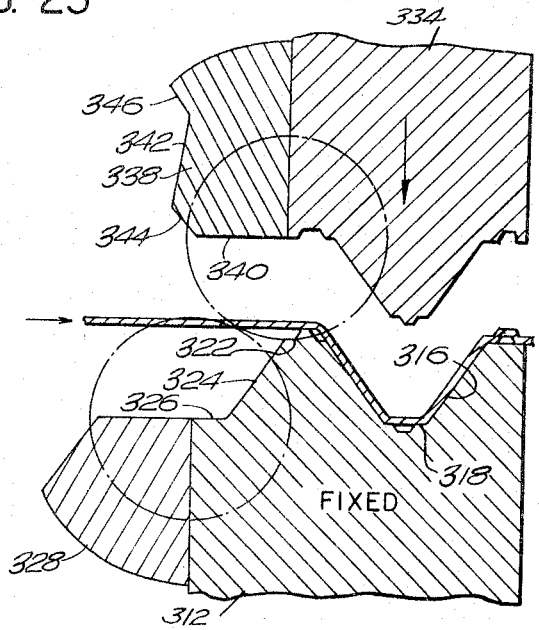
FIG. 25 is an enlarged detail sectional view of the corrugated jaws shown in FIG. 21.

To complete the operation, the press plate 336 carrying the press member 334 and rotatable press member 338 is moved upwardly to the feed position of FIG. 25, the press member 338 is rotated clockwise and the press member 328 is rotated counterclockwise to the respective retracted starting positions of FIG. 25. Finally, the filter strip 31 has imparted thereto manually or automatically by a suitable feed device, not shown, a stepped advance removing the completed wave from the die 312 and substituting therein the newly formed wave portion as shown in FIG. 25.

Figure 21:
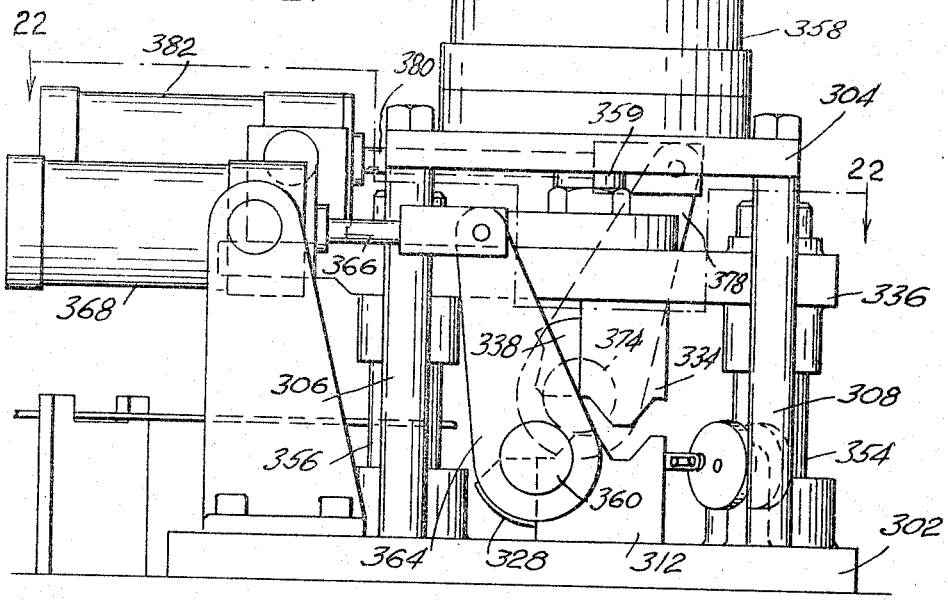
FIG. 21 is a view in side elevation of the mechanism by means of which the waves of the waved strip are formed.
Figure 22:
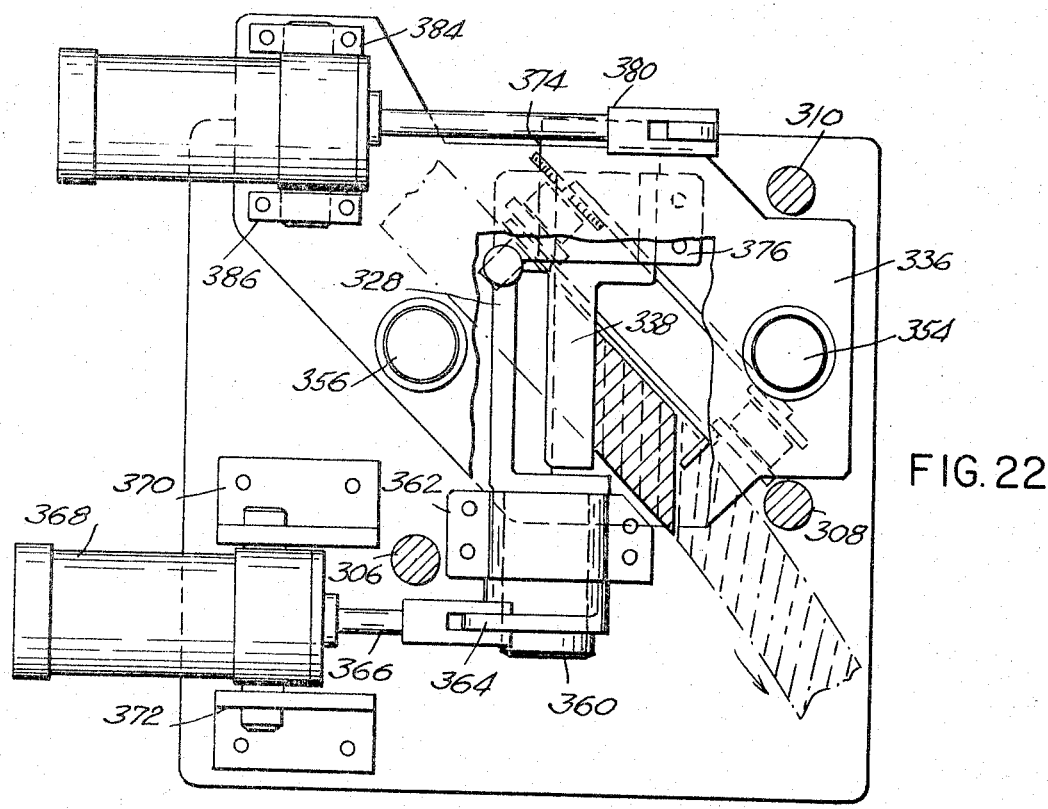
FIG. 22 is a sectional plan view taken on a line 22—22 of FIG. 21.
Figure 23:
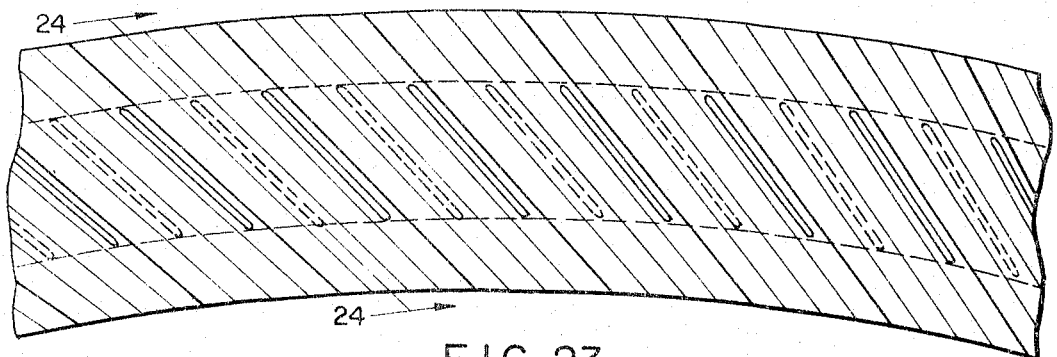
FIG. 23 is a plan view of a section of the waved strip formed by the corrugating machine of FIGS. 21 and 22.
Figure 24:
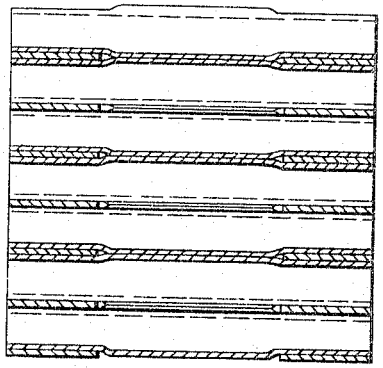
FIG. 24 is a fragmentary vertical sectional view of a portion of the built-up wall of the filter drum.

The supporting and actuating devices for the several die and press members of the filter strip corrugating machine are best shown in FIGS. 21 and 22. The press plate 336 moves vertically on two vertical guide posts 354, 356 carried in bosses formed on the base plate 302. For effecting the downward press and retracting movements to the press plate 336 a pneumatically operated cylinder 358 is mounted on the fixed top plate 304 of the frame, and is provided with a piston 359 which is secured at its lower end to the press plate 336.

The rotatable press member 328 associated with the fixed die 312 is formed on the projecting end of a large diameter shaft 360 mounted on a bearing block 362 on the fixed base 302. It will be noted that the rotational axis of the shaft 360 and press member 328 formed thereon coincide with the left hand edge of the lower flat surface 326 of the fixed die member 312. A crank arm 364 attached to the shaft 360 is pivotally connected with the piston element 366 of a pressure cylinder 368 pivotally mounted on upright supports 370, 372 secured to the bottom plate 302 of the frame. The rotatable press member 338 associated with the movable press member 334 is formed on the projecting end of a large diameter shaft 374 mounted in a bearing block 376 secured to the underside of the press plate 336 so that the rotational axis of the shaft 374 and press member 334 will coincide with the left hand edge of the upper flat 322 of the press member 334. A crank arm 378 secured to the outer end of the shaft 374 is connected at its upper end with the piston element 380 of a pressure cylinder 382 pivotally supported between two upright supports 384, 386 secured to the upper face of the press plate 336.

Figure 26:
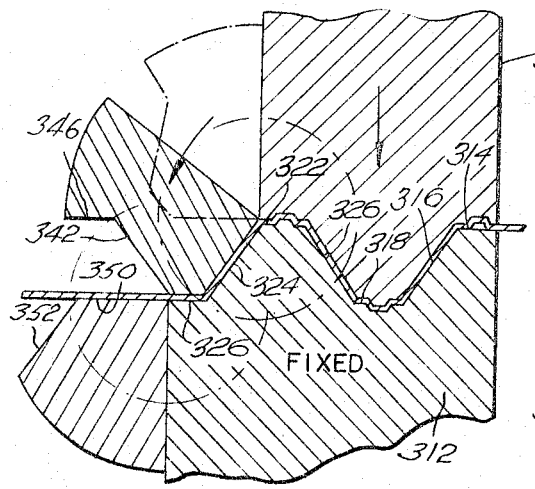
FIG. 26 is a sectional view similar to FIG. 25, but showing principally the jaws in their closed strip-shaping position.
Figure 27:
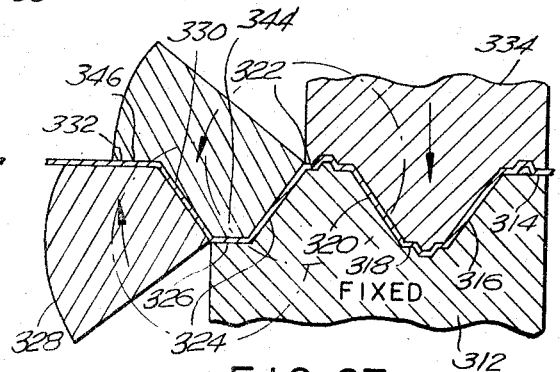
FIG. 27 is a detail sectional view similar to FIG. 26, but with both secondary jaws in a strip-forming position.
Figure 28:
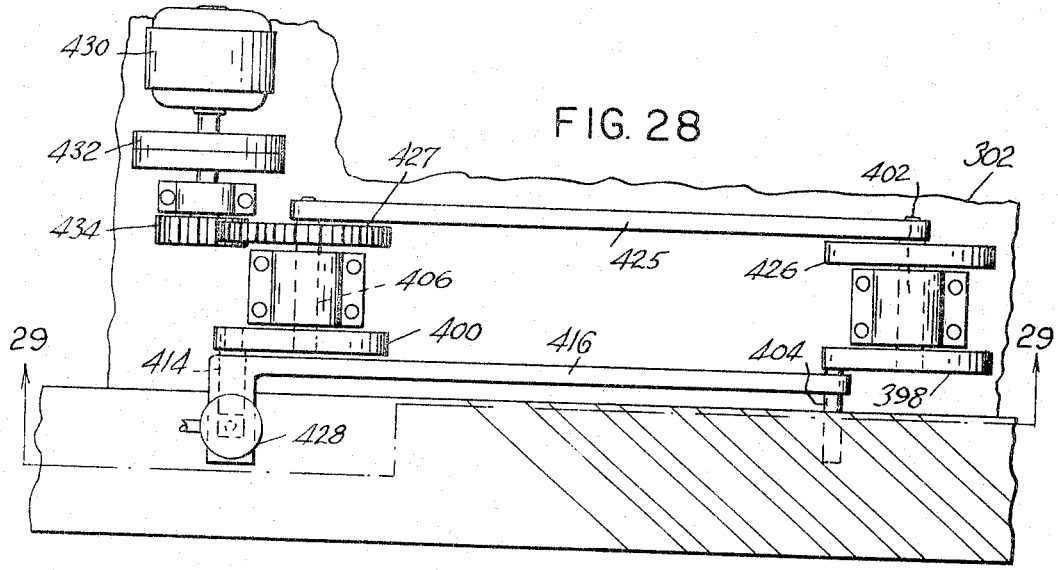
FIG. 28 is a detail plan view of the feed mechanism for feeding the waved filter strip through the filter strip waving machine.
Figure 29:
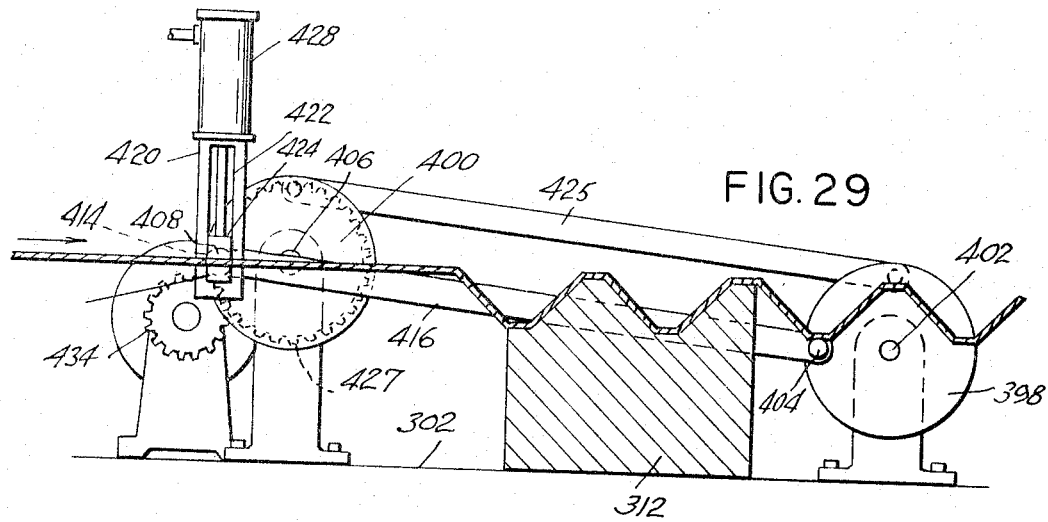
FIG. 29 is a detail view in side elevation of substantially the parts shown in FIG. 28.

The filter strip is advanced through the filter strip corrugating machine by means of a step feed mechanism which operates when the press plate 336 and associated parts are in a raised position to lift the corrugated portion of the filter strip off the fixed press surfaces 316, 318, 320, 322, 324 and 326 and to advance the filter strip the length of one complete corrugation from the position shown in FIG. 26 to the position of FIG. 25 preparatory to the start of the next succeeding press operation. The step feed mechanism referred to, as best shown in FIGS. 22, 28 and 29, comprises a feed crank 398 mounted on the base plate 302 of the filter strip corrugating machine at one side of the corrugated filter strip as it leaves the press area, and a feed drum 400 which is located at one side of the filter strip on the base plate 302 of the corrugating machine at a point adjacent to which the filter strip enters the press area. The crank 398 is carried on a shaft 402 having its axis in a horizontal plane at right angles to the direction of travel of the filter strip. The crank 398 carries a strip engaging rod 404 which is adapted to engage beneath and to lift the corrugated strip. The feed drum 400 is supported on a horizontal shaft 406 which is set at right angles to the direction of the feed of the strip and provides support for a pair of feed grippers 408 and 410 which are adapted for a movement in a circular path to grip and to advance the approaching portion of the filter strip. The grippers 408, 410 and rod 404 operate in unison to raise and to advance the intervening portion of the filter strip which is engaged with the corrugating press elements of the corrugating machine.

The drum 400 and supporting shaft 406 turn on an axis in a horizontal plane at right angles to the direction of movement of the strip substantially at the same level with the strip. The lower feed gripper 410 is rotatably supported on the end of a barrel 414 rotatably supported in a bore extending inwardly from one end face of the drum 400 parallel to the axis thereof. The feed gripper 410 and the barrel 414 are maintained at all times in the same angular position by means of a link 416 secured at one end to the barrel and at its other end to the crank 398. An upward extension 420 of said link is formed with a vertical guideway 422 in which is carried a supporting slide 424 for the second feed gripper 408. With this arrangement it will be noted that the feed grippers 408, 410 are maintained at all times in the same angular positions as they are guided toward and from one another to grip and advance the corrugated strip and are thereafter moved apart to effect the return movement of the gripper mechanism to its initial starting position. A second connecting link 425 is connected between a disc 426 secured to the rear end of pivot shaft 402 and the rear face of a driving gear 427 on the rear end of pivot shaft 406 to assist in driving the feed disc 398 in unison with the drum 406. Movement of the upper gripper member 408 between a raised return position and its lowered filter strip gripping and feed position is effected by means of an air cylinder 428 secured to the upright portion of the link 416 and with an operating piston connected at its lower end with the supporting slide 424 for the upper feed gripper 408.

The feed drum 400 and shaft 406 will be driven through one revolution from the position of FIG. 29 to effect each successive advancing movement of the filter strip through the corrugating machine. During the first half revolution the air cylinder 428 is actuated to move the upper gripper 408 downwardly to gripping position with relation to the lower gripper 410 against the filter strip this being the position of FIG. 29. At the beginning of the next half revolution, the air cylinder 428 is rendered inoperative thus releasing the pressure upon the upper gripper 408. The drum 400 and shaft 406 are at this time turned through a second half revolution so that the grippers are returned to their initial position of FIG. 29 preparatory for again gripping and advancing the filter strip. The connections by means of which the feed drum 400 and shaft 406 are driven through successive half revolutions consist of a continuously driven electric motor 430 and a one-revolution clutch 432 which is in turn connected through gears 434 and 427 to the shaft 402. The gears 434, 427 have a 1:2 ratio so that the shaft 402 and feed drum 400 are driven through one-half revolution only for each full revolution of the one-revolution clutch.

The operation of the several mechanisms for forming, positioning and attaching successive increments of the helically disposed filter strip assembly to the filter drum build-up will be particularly described in connection with FIGS. 29 to 31, inclusive, of the drawings. The several pneumatic and electrical operating devices above described are operated and controlled by means of a rotary control switch cam drum 440 illustrated in section in FIG. 29 and diagrammatically in FIG. 30. The switch drum 440 consists of a series of switch cam rings numbered I to XI, inclusive, mounted on a drum shaft 442 which is driven through one revolution for each complete cycle of forming, positioning and attaching an increment of the filter strip to the filter drum build-up 30. The drum shaft 442 is driven from motor 46 through reduction gearing which includes the reduction gear box 50, and connections therefrom including a gear box 446. As best shown in FIG. 29, each of the cam rings I to XI, inclusive, is engaged by a cooperating switch element, said elements being numbered from I' to XI', respectively. As indicated by the captions on the several cam rings of the diagrammatic FIG. 30 and as more specifically illustrated in the wiring diagram of FIG. 31, the switch elements I' to XI' are connected to operate the several pneumatic cylinder and electrical operating devices of the apparatus.

It is assumed that the drum support 44 and the drum build-up thereon is continuously rotated, and that the waved filter strip 31 and tie strips 32, 33 are being shaped and helically fed to the drum build-up. In accordance with the system of operation developed, each of the main slide 100 and the auxiliary slide 122, 124 in alternation is released from any connection with the advancing filter strip assembly and is back fed by a predetermined amount whereupon the gripping and fastening devices on said slide are again rendered operative causing the slide to be secured to and to advance again with the filter strip assembly.

The pneumatic cylinder 236 for back tracking first one and then the other of the feed slide 100 and the auxiliary slide 122 is controlled by a two-way valve and a solenoid actuated switch VI' which operates when opened to retrack the secondary slide 122.

Since the secondary slide is at this time secured to move with the filter drum build-up, the main slide is advanced relatively thereto to a new filter strip engaging and welding position, said movement being limited by the engagement of the abutment 252 on the secondary slide with the adjustable stop 244 on the main slide 100. (See FIGS. 5 and 18.)

Said advancing movement of the main slide 100 continues during approximately one quarter turn of the cam switch cycle.

At the end of one-half revolution of the cam switch the switch VI' cam follower moves onto the high portion of its cam VI causing the switch VI' to close thereby energizing the solenoid 450 reversing the pneumatic cylinder 236, causing the auxiliary slide 122 to be advanced relatively to the main slide 100 to a new filter strip and filter strip drum engaging position. This advancing movement of the auxiliary slide 122 is completed approximately at 270° of rotation of the drum switch when the abutment 252 comes into contact with the adjustable stop 246 on the auxiliary slide 122.

Figure 30:
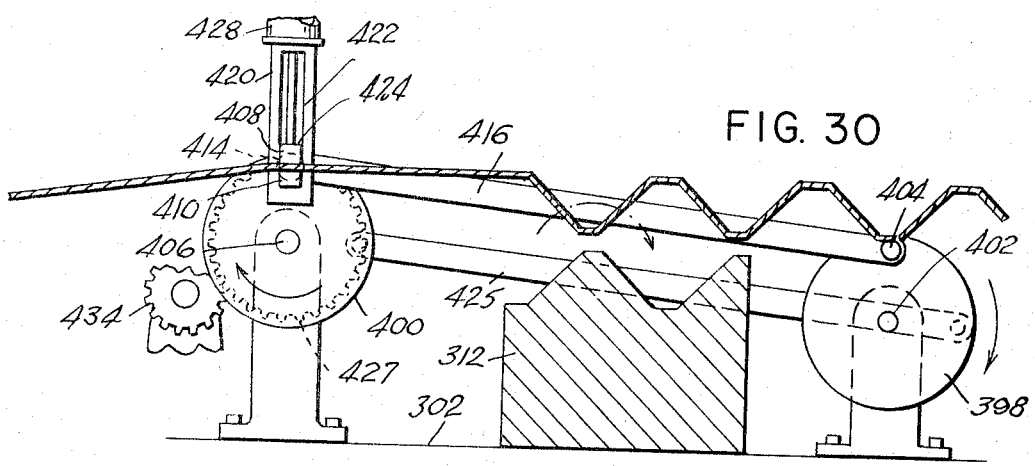
FIG. 30 is a view similar to FIG. 29, but showing the feed drum and associated grippers rotated 90° so that the waved filter strip has been raised out of engagement with the die and partially advanced to the next wave forming position.
Figure 31:
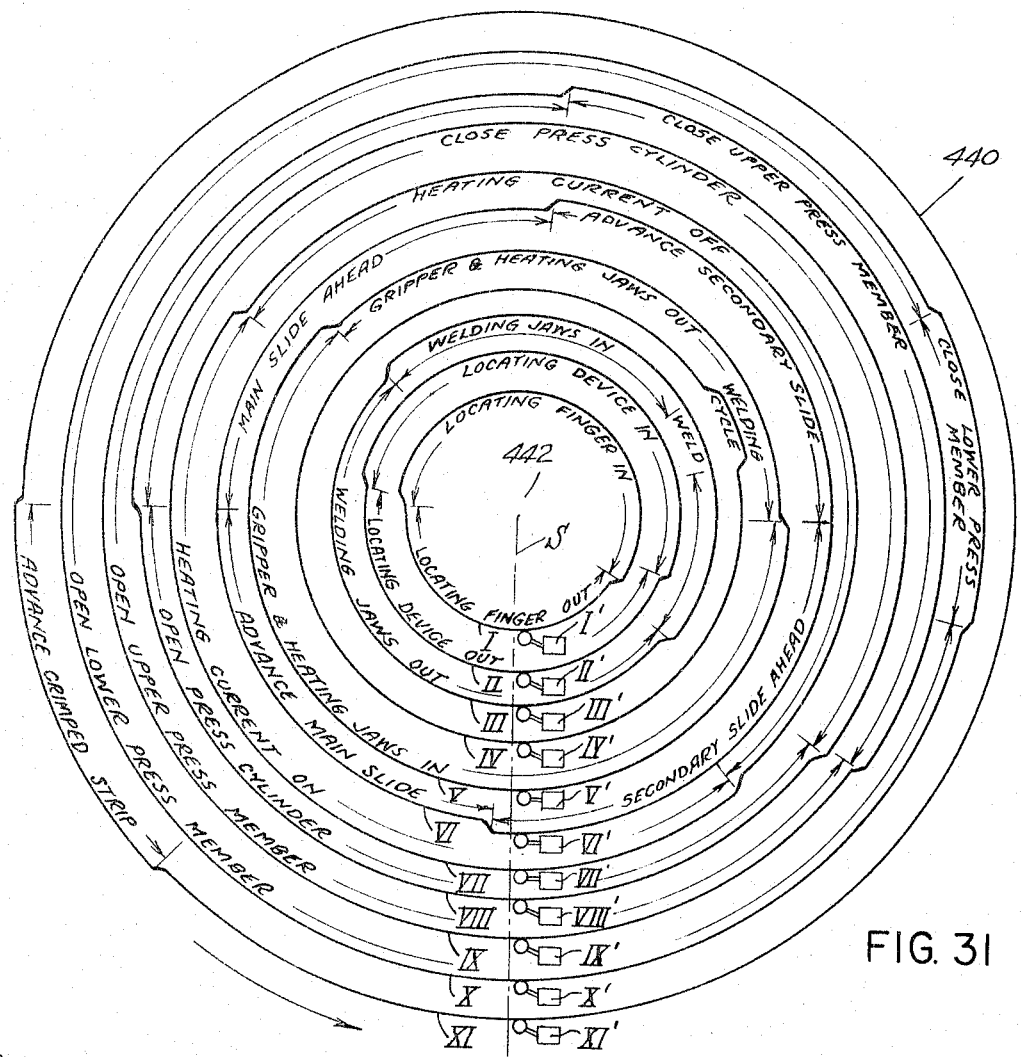
FIG. 31 is a diagrammatic view of the cam portion of the cam switch for operating the mechanism for guiding and attaching strip material to the rotating drum build-up in accordance with a predetermined cycle of operation.
Figure 32:
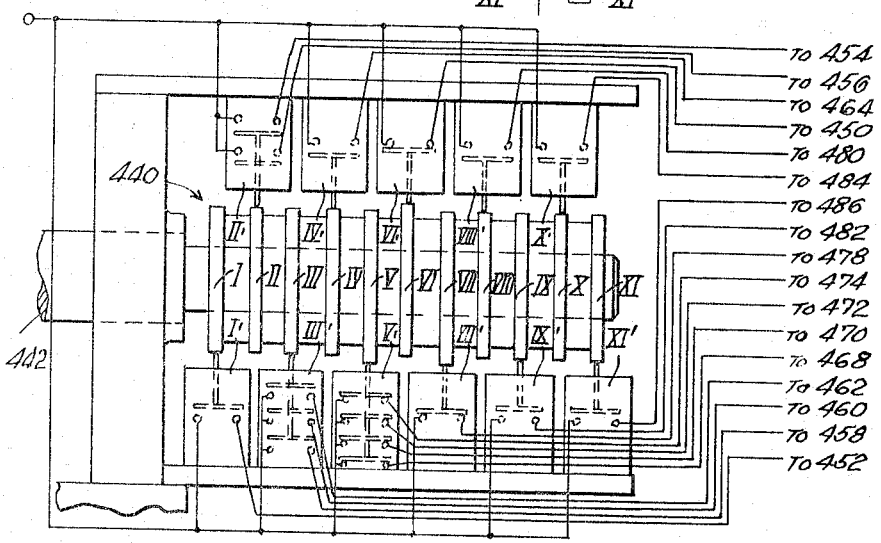
FIG. 32 is a view in side elevation of the cam switch shown diagrammatically in FIG. 31.

Referring specifically to FIGS. 29 to 31 the operation is assumed to start from the position S of FIG. 29 at which the switch VI' is opened by the movement of the switch VI' follower onto the low portion of cam VI to start the retracking of the secondary slide, or in effect the advance of the main slide 100 to a new filter strip engaging and fastening position.

For the position S at which the cam VI becomes operative to initiate the advancing movement of the main feed slide 100 the several operations associated with said main slide will have been discontinued as follows:

The lock finger 201 actuated by pneumatic cylinder 202 will have been withdrawn as cam switch I' rides on the low portion of cam I causing the actuating solenoid 452 to be deenergized.

The lock press member 196 and the side press member 204 will have been withdrawn by the respective pneumatic cylinders 200 and 212 (FIGS. 10 and 9) as cam switch II' rides on the low portion of cam II causing actuating solenoids 454 and 456 to be deenergized.

Figure 33:
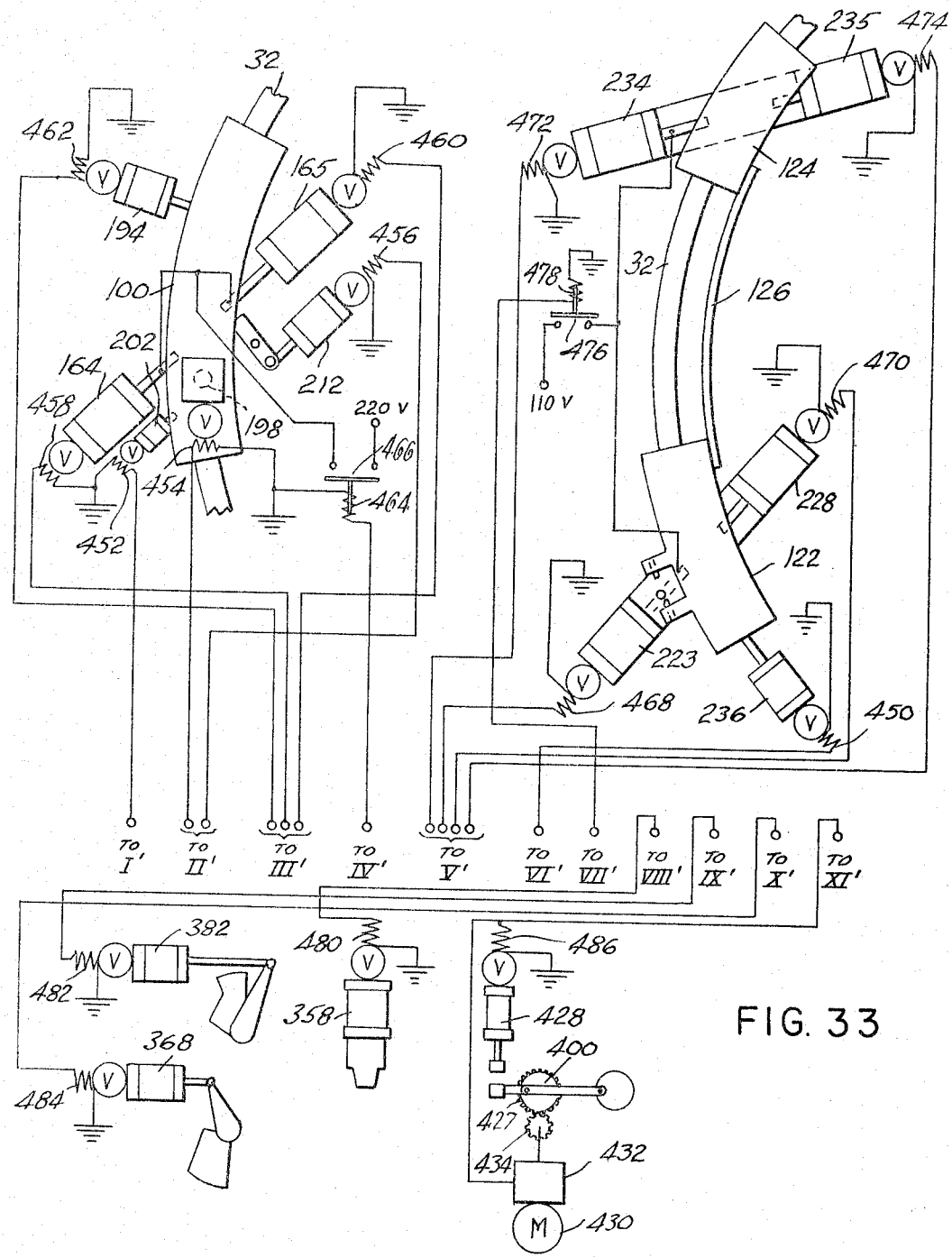
FIG. 33 is a diagrammatic view of the electrical connections by means of which the cam switch is connected to control the operation of the several cooperating elements of the machine.

The welding jaws 154 and the spot welding head 190 will have been withdrawn by their respective pneumatic cylinders 164, 165 and 194 (see FIGS. 9, 10 and 11) as cam switch III' rides on the low portion of cam III causing solenoids 458, 460 and 462 to be deenergized, and the welding apparatus controlled by cam switch IV' is inoperative as the switch IV' rides on the low portion of the cam IV causing solenoid 464 for control switch 466 (FIG. 33) to be deenergized.

For position S the several operations associated with the auxiliary slides 122, 124 will be fully operative as follows:

The gripper and heating jaws 220, 222 and 232, 233 are supported firmly in gripping engagement with the new and next previously secured coils of filter strip by their respective pneumatic cylinders 223, 228, 234 and 235 as the switch V' rides on the high portion of its cam V causing each of the actuating solenoids 468, 470, 472 and 474 to be energized.

A heating current is passed continuously through portions of the filter strip extending between units C and D through a circuit which includes the jaws 220, 222 of unit C and the jaws 232, 233 of unit D and an off-and-on switch 476 which is actuated by the closing of cam switch VII' riding on a high portion of its operating cam VII which causes switch actuating solenoid 478 to be energized.

For the position S of FIG. 30, the filter strip corrugating machine is conditioned for advancing the crimped strip.

The press cylinder 358 is retracted causing the movable pressplate 336 and press block 334 to occupy the raised position of FIG. 21 as cam switch VIII' rides on a depressed portion of its operating cam VIII deenergizing the press cylinder actuating solenoid 480.

The pneumatic cylinder 382 for the upper rotatable press member 338 is positioned so that the upper rotatable press member 338 is in its open position as the cam switch IX' rides on a low portion of its operating cam IX causing cylinder 382 actuating solenoid 482 to be energized.

The pneumatic cylinder 368 and lower rotatable press member 328 connected thereto are maintained in open position as cam switch X' rides on a low portion of its operating cam X, causing the cylinder 368 actuating solenoid 484 to be deenergized.

The operation of the feed mechanism for the corrugating machine is initiated by the operation of cam switch XI' which closes, energizing the solenoid 486 thus operating the air cylinder 428 to engage the feed grippers 408, 410 at the same time the one-revolution clutch 432 is actuated causing the shaft 406 and feed drum 400 to be rotated through one-half revolution. During this movement the grippers 408, 410 and the crank supported bar 404 are moved upwardly, forward and then downwardly causing the filter strip to be raised and advanced over the die 312 the length of one wave. When the switch XI' rides off the high portion of cam XI and is returned to its open position, the solenoid 486 is deenergized. The arrangement of the electrical connections is such that the actuating valve for air cylinder 428 is actuated to release the pressure therefrom so that the gripper 408 is free to ride upwardly in its guideway 422. At the same time the one-revolution clutch 432 is tripped into operation so that the feed drum 400 is turned through a second half revolution to its starting position completing the feed cycle. During this second half revolution in which the solenoid 422 is moved downwardly, the upper gripper 408 is free to ride upwardly in its guideway 422 while being moved leftwardly along the upper surface of the filter strip to its initial start position.

During the first quarter revolution of the control cam drum from the position S while the auxiliary slide 122, 124 is secured to move with the filter drum build-up 30 by the continued engagement of the clamping and heating jaws 220, 222 and 232, 233 with the previously welded coils of the filter strip, the main feed slide 100, disconnected from the filter drum build-up 30, is advanced to the next succeeding fastening position.

During this quarter revolution also the strip feeding mechanism associated with the filter strip corrugating machine is rendered operative to effect a step advance of the filter strip through the corrugating machine.

During the second quarter revolution of the control cam drum from the position S after the advance of the main slide 100 has been completed, the several instrumentalities carried by the main slide 100 are rendered operative as follows: The cam switch I' is engaged by a high portion of its cam I to insert the locating finger 201, the cam switch II' is engaged against a high portion of its cam II to engage the side press member 206 and to insert the filter strip positioning and press in element 196. Cam switch III' is actuated by a rise portion of its cam III to insert the welding jaws 154 and secondary spot welding device 190, and cam actuated switch VII' rides off the high portion of its cam VII to shut off the heating current, gripping, and heating units C and D. The cam actuated switch V' is disengaged from the high portion of its cam V to effect the withdrawal of the gripping and heating jaws 220, 222 and 232, 233 mounted on the auxiliary slide 122, 124. Also, during the second quarter revolution of the cam drum, switch VIII' is actuated by a rise portion of its cam VIII to move the main press element 334 of the corrugating machine downwardly to its press position as shown, for example, in FIG. 26.

During the third quarter revolution from position S the switch VI' is actuated by a rise portion of its cam VI to advance the secondary slide 122, 124 with relation to the main slide 100 which is at this time fixedly secured to the filter drum build-up. During this third quarter revolution the cam switch IV' engages a rise portion of its cam IV energizing welding switch solenoid 464 to effect the welding of the newly applied coil of the filter strip to the filter drum build-up at the location of the welding jaws 154 and auxiliary spot welding device 190. At the beginning of the third quarter revolution of the cam drum, the cam actuated switch IX' is engaged by a high portion of its cam IX to move the upper rotatable press member 346 of the corrugating machine from the dot-and-dash position to the solid line closed position of FIG. 26. Thereafter the cam actuated switch X' of the corrugating machine is engaged by a high portion of its cam X to rotate the lower rotatable press member 328 from the position in FIG. 26 to the closed position of FIG. 27.

During the fourth quarter revolution of the cam drum the auxiliary slide 122, 124 is again fixedly secured to the filter drum build-up 30 and the main slide 100 is operatively disconnected therefrom to complete the cycle as follows:

Cam switch V' is actuated by a rise portion of its cam V to insert the gripper and heating jaws 220, 222 and 232, 233 carried by the auxiliary slide 122, 124.

Cam VII' engages a rise portion of its cam VII to close the heating circuit through said gripper and heating jaws and intervening portion of the filter strip build-up.

Cam switch II' is actuated by cam II to withdraw the lateral press member 204 and vertical press member 196 carried on the main slide 100.

Cam switch I' is actuated by its cam I to withdraw the locating finger 201.

Cam switch III' is rendered operative by its cam III to withdraw the welding fingers 154 and the spot welding device 190.

During the fourth quarter the cam switch X' rides again onto a low portion of its cam X to shift the lower rotatable press member 328 of the corrugating machine to its open position.

The cam switch VIII' rides on a low portion of its cam VIII causing the main press member 334 of the corrugating machine to be moved upwardly to its open position and finally the switch X' is actuated by its cam X to shift the upper rotatable press member 346 of the corrugating machine again to the retracted solid line position in FIG. 25.

It will be understood that such changes may be made in the choice and arrangement of the electrical control equipment employed as may be found desirable within the spirit and scope of the invention for producing the desired accuracy in the operation of the positioning and fastening device above described.

The invention having been described what is claimed is:

1. The method of manufacturing a filter drum from successively produced coils of a filter strip assembly comprising a waved strip and at least one separate straight tape which comprises the steps of rotating a rotary support, guiding said filter strip assembly onto said rotary support and winding it into successive helical coils progressively stacked on each other to form an axial drum build-up, and fastening successive portions of said filter strip assembly to said rotating drum build-up.

2. The method of manufacturing a filter drum from successively produced coils of a filter strip assembly comprising a waved metallic strip and a pair of separate metallic tapes which comprises the steps of continuously rotating a rotary filter drum support, guiding said waved strip and said tapes onto said rotating drum support and winding said waved strip and said tapes into successive helical coils progressively stacked on each other to form an axial drum build-up, and separately guiding and welding successive portions of each of said waved strip and said tapes to said rotating drum build-up.

3. The method of manufacturing a filter drum from successive coils of a helically wound filter strip assembly comprising a waved strip and a pair of separate tapes which comprises the steps of continuously rotating a filter drum support, forming waves in and imparting a lateral curvature to said waved strip, subjecting each of said tapes to a transverse roller pressure of increasing intensity from one side to the other to reduce said tapes to a wedge-shaped cross-section, and thereby to impart a curvature laterally to the tapes tapered by said roller pressure, feeding said waved strip and said tapes to said rotating drum support and winding said waved strip and said tapes into successive helical coils progressively stacked on each other to form an axial drum build-up, and separately guiding and welding successive portions of each of said waved strip and said tapes to said rotating drum build-up.

4. In a machine for manufacturing a filter drum from successive coils of a helically wound filter strip assembly helically fed to a rotating drum build-up, the combination of a filter strip guiding and attaching mechanism, supporting means on which said guiding and attaching mechanism is movable along a path with the filter strip being fed to said filter drum build-up, means for intermittently connecting said supporting means on a portion of said filter strip assembly, and simultaneously for actuating said attaching mechanism to attach said portion of said filter strip assembly to said filter drum build-up, and means for thereafter shifting said supporting means along said path in a direction counter to the feeding direction of said filter strip for positioning said attaching mechanism on a following portion of said filter strip assembly.

5. In a machine for manufacturing a filter drum from successive coils of a helically wound filter strip assembly helically fed to a rotating drum build-up, the combination of mechanism for helically guiding into position and for attaching said filter strip assembly to previously positioned and attached coils of said drum, which comprises a gripper and weld mechanism adapted for engaging and welding together portions of said filter strip and said filter drum build-up, a gripper and weld mechanism support movable along a path with the filter strip during said welding operation, a feed support movable along said path connected with said weld mechanism support for a limited movement relative thereto, a gripper mechanism on said feed support intermittently engaging said filter drum build-up, and means operable during the continued advance of said filter drum build-up and acting in sequence to initiate a gripping and welding operation, during said gripping and welding operation to release said gripper mechanism and to backfeed said feed support, to apply said gripper mechanism and thereby to resume the advance of said feed support, to disengage said gripper and weld mechanism and to backfeed said weld mechanism support during continued advance of said feed support, and to engage said gripping and welding mechanism and thereby to resume the advance of said gripper and weld mechanism support.

6. In a machine for manufacturing a filter drum from successive coils of a helically wound filter strip assembly helically fed to a rotating drum build-up, the combination of mechanism for helically guiding into position and for attaching said filter strip assembly to previously positioned and attached coils of said drum, which comprises a weld mechanism adapted for engaging and welding together portions of said filter strip and said filter drum build-up, a weld mechanism support movable along a path with the filter strip during said welding operation, a feed support connected with said weld mechanism support for a limited movement relative thereto along said path, a gripper mechanism on said feed support intermittently engaging said filter drum build-up, and means acting when rendered operative to relatively shift said weld mechanism support and said feed support from one to the other limit of said movement, and control means for actuating said weld mechanism, said gripper mechanism and said support shift mechanism in sequence to effect successive welds of said filter strip assembly to said filter drum build-up.

7. In a machine for manufacturing a filter drum from successive coils of strip material helically fed to a rotating drum build-up, the combination of a rotating support on which said drum is built up, and mechanism for guiding and for attaching said strip material to said rotating drum build-up which comprises a pair of slides connected for a limited relative movement along an arcuate path about the peripheral edge of said rotating drum build-up, strip material gripping and fastening means carried by said slides, including a gripping device for securing each said slide to the peripheral edge of said drum build-up, and means connected between said slides to back feed each slide alternately with relation to the other said slide and to disengage the gripper securing said slide to the drum build-up during said back-feeding movement.

8. In a machine for manufacturing a filter drum from successive coils of strip material helically fed to a rotating drum build-up, the combination of a rotating support on which said drum is built up, and mechanism for guiding and for attaching said strip material to said rotating drum build-up which comprises a pair of slides connected for movement between limit positions relatively to one another in an arcuate path along the peripheral edge of said drum build-up, means for effecting a back-feeding movement of each said slide in turn, operating devices on said slides for guiding and fastening said strip material to the drum build-up including gripping devices for securing the respective slides to move with the drum build-up, and control means timed with relation to the rotation of said drum build-up for moving the slides about the peripheral edge of the drum build-up for the performance of successive fastening operations in accordance with an operating cycle which comprises engaging the grippers of one slide with the drum build-up thereby attaching said slide to move as a unit with the drum build-up, disengaging the grippers on the other said slide from the drum build-up, and operating said slide back-feeding means to back-feed said other slide to the limit position relatively to said first slide about the peripheral edge of the drum build-up, and thereafter engaging the grippers of the said other slide with the drum build-up thereby attaching said other slide to move as a unit with the drum build-up, disengaging the grippers on said first slide from the drum build-up, and operating said slide back-feeding means to back-feed said first slide to the limit position relatively to said second slide about the peripheral edge of the drum build-up.

9. A machine for manufacturing a filter drum from successive coils of strip material helically fed to a rotating drum build-up according to claim 8, in which the control means comprises electrically operated devices with alternate positions for engaging and for disengaging the grippers on each said slide and an electrically operated device having alternate positions for effecting the advance of each each of said slides, a cam switch connected to be driven in synchronism with said rotating support, and cam and follower connections with said electrically operated devices rendered operative by rotation of said cam switch for actuating the grippers associated with each said slide and for initiating a predetermined feed movement of each said slide in turn in accordance with said operating cycle.

10. In an apparatus for the manufacture of a honeycomb filter drum from strip material having means for supplying preformed flat tie strip material and waved filter strip material, each having a lengthwise transverse curvature corresponding with the peripheral curvature of the drum, the combination of a honeycomb filter building mechanism comprising a rotatable platform for supporting and building successive helically wound coils of said flat material into a filter drum, means for rotating said platform and drum build-up thereon, and mechanism for guiding and for attaching said strip material to said rotating drum build-up which comprises a main slide and a feed slide connected for movement between limit positions relatively to one another in an arcuate path along the peripheral edge of said drum build-up, said main slide having supported thereon a slide locating finger arranged for engagement between adjacent waves of a previously laid coil of said waved filter strip material, vertical and lateral press positioning elements arranged for engagement with feeding strip material, weld-forming grippers, and means for supplying a weld-forming current therethrough, said feed slide having mounted thereon separated grippers and means for supplying an electrical heating current therebetween, actuating means connected between said slides for back-feeding each of said main slide and said feed slide relatively to one another alternately by a predetermined amount, and control means comprising a cam switch positively driven in synchronism with said rotating support, and electrical connections actuated thereby for back-feeding said main slide, and thereafter for operating each device on said main slide including said locating finger, said vertical and lateral press positioning elements, said welding jaws, and said means for applying a welding current therethrough, and for disengaging the feed slide grippers, for back-feeding said feed slide, and thereafter for operating each device on said feed slide including said feed slide grippers and said means for applying a heating current therethrough, and for disengaging each of said devices on said main slide.

11. In an apparatus for the manufacture of a honeycomb filter drum from strip material having means for supplying preformed flat tie strip material and waved filter strip material each having a longitudinal transverse curvature corresponding with the peripheral curvature of the drum, the combination of a honeycomb filter drum building mechanism comprising a rotatable platform for supporting and building successive helically wound coils into a filter drum, means for rotating said platform, mechanism for guiding and for attaching strip material to said rotating drum build-up which comprises a slide support having an arcuate guideway following the peripheral edge of said drum build-up, a pair of slides carried on said guideway connected for movement relatively to one another in an arcuate path about the peripheral edge of said drum build-up, operating devices on said slides for guiding and fastening said strip material to the drum build-up including gripping devices operable to secure the respective slides to move with the drum build-up, means connected between the slides operable to effect a limited back feed of each slide alternately while the other said slide is held by said grippers to move with the drum build-up, and supporting means for said slides comprising a standard adjacent said platform, a support vertically shiftable on said standard, vertical guides connecting said slide support with said support for vertical adjustment relative thereto, and a biasing device connected between the support and said slide support acting upwardly upon said slides to reduce the weight of said slides on the peripheral edge of said drum build-up, and means timed with the rotation of said platform for raising said support on the standard at the rate of build-up.

12. In an apparatus for the manufacture of a honeycomb filter drum from preformed flat tie filter strip material and flat transversely waved strip material, each said strip having a longitudinal transverse curvature corresponding with the peripheral curvature of the drum, the combination of a honeycomb filter drum building mechanism comprising a continuously rotatable platform for supporting and building successive coils of said flat strip material helically wound on the rotatable axis of said support into a filter drum, and a device for assembling said flat tie and waved strip material into an assembled filter strip and for applying said filter strip in successive helical coils to form the built-up honeycomb filter drum including an adjustable supporting means adjacent said platform, an arcuate main slide carried on said supporting means overlying the peripheral edge of said drum for advancing movements with and back-feed movements relative to said peripheral edge, a guiding device on said main slide operable during said back feeding movements of the main slide for assembling said tie and waved filter strip material into a filter strip assembly engaging previously formed coils of said drum, fastening means on said main slide operable during said advancing movements of the main slide for securing said strip material to previously formed coils of said drum, an arcuate feed slide slidably connected to said main slide for advancing movement with and back-feeding movement relative to the drum along said arcuate path, means for advancing each of said slides with said drum alternately, and means connected between said slides operable during the advancing movement of said feed slide to back feed said main slide and during the advancing movement of the main slide to back feed the feed slide.

13. In an apparatus for the manufacture of a honeycomb filter drum from strip material having means for supplying preformed flat tie strip material and waved filter strip material each having a longitudinal transverse curvature corresponding with the peripheral curvature of the drum, the combination of a honeycomb filter drum building mechanism comprising a rotatable platform for supporting and building successive helically wound coils of said flat material into a filter drum, means for rotating said platform, a device for assembling said tie and waved filter strip material into an assembled filter strip and for applying said assembled filter strip in successive helical coils to form the built-up honeycomb filter drum, including an adjustable supporting means adjacent said platform, an arcuate main slide carried on said supporting means overlying the peripheral edge of said drum for advancing movements with and back-feeding movements relative to said peripheral edge, a guiding device on said main slide operable during said back-feeding movements of the main slide for assembling said tie and waved filter strip material into a filter strip assembly engaging previously formed coils of said drum, fastening means on said main slide operable during said advancing movements of the main slide for securing said strip material to previously formed coils of said drum, an arcuate feed slide slidably connected with said main slide for advancing movement with and back-feeding movement relative to the drum along said arcuate path, means for advancing each of said slides with said drum alternately, and means connected between said slides operable during the advancing movement of said feed slide to back feed said main slide, and during the advancing movement of the main slide to back feed the feed slide.

14. In an apparatus for the manufacture of a honeycomb filter drum from strip material having means for supplying preformed flat tie filter strip material and corrugated strip material each having a longitudinal transverse curvature corresponding with the peripheral curvature of the drum, the combination of a honeycomb filter drum building mechanism comprising a rotatable platform for supporting and building successive helically wound coils of said flat material into a filter drum, means for rotating said platform, a device for assembling said tie and corrugated strip material into an assembled filter strip and for applying said assembled filter strip in successive helical coils to form the built-up honeycomb filter drum, including an adjustable supporting means adjacent said platform, an arcuate main slide supported on said supporting means overlying the peripheral edge of said drum for advancing movements with and back-feeding movements relative to said peripheral edge, a guiding device on said main slide operable during said back-feeding movements of the main slide for assembling said tie and waved filter strip material into a filter strip assembly engaging previously formed coils of said drum, fastening means on said main slide operable during said advancing movements of the main slide for securing said strip material to previously formed coils of said drum, an arcuate feed slide slidably connected with said main slide for advancing movement with and back-feeding movement relative to the drum along said arcuate path, a gripper device operable intermittently for securing the main slide to advance with said drum, a second gripper device operable in alternation with said main slide gripping device to secure the feed slide to advance with the drum, and means connected between said slides operable during the advancing movement of said feed slide to back feed said main slide and during the advancing movement of the main slide to back feed the feed slide.

15. In a machine for manufacturing a filter drum from successive coils of a helically wound filter strip assembly comprising a pair of transversely curved tapes and a transversely curved waved strip, helically fed to a rotating drum build-up, the combination of mechanism for helically guiding into position and for attaching said filter strip assembly including said tapes and said waved strip to previously positioned and attached coils of said drum, which comprises an arcuate main slide supported for forward and back arcuate movement along the periphery of said rotating drum build-up, filter strip assembly engaging means and fastening means mounted on said arcuate slide, a feed slide supported for a limited movement relative to said main slide in the same arcuate path with said main slide, drum build-up engaging means on said feed slide, and means for actuating said drum build-up engaging means for engaging said feed slide with the rotating drum build-up, means for actuating said drum build-up engaging means and said fastening means to advance said main slide with the drum build-up and simultaneously to fasten said filter strip assembly to said build-up, and means for disengaging and for back feeding each of said slides alternately during the continued advance of the other said slide.

16. In a machine for manufacturing a filter drum from successive coils of a helically wound filter strip assembly according to claim 15 in which there is provided support for said arcuate main slide and feed slide movable on the machine longitudinally of said drum build-up, and driving means for rotating said drum build-up and for advancing said support in timed relation.

References Cited by the Examiner
UNITED STATES PATENTS

| | | | |
|---|---|---|---|
| 2,042,537 | 6/1936 | Liddell | 210—497.1 |
| 2,421,704 | 6/1947 | Kasten | 210—497.1 |
| 2,843,722 | 7/1958 | Wegeforth | 219—80 |
| 3,025,963 | 3/1962 | Bauer | 210—487 |

FOREIGN PATENTS

| | | |
|---|---|---|
| 703,823 | 2/1954 | Great Britain. |
| 318,033 | 1/1957 | Switzerland. |

RICHARD M. WOOD, *Primary Examiner.*

B. A. STEIN, *Assistant Examiner.*